US012621860B2

(12) United States Patent
Li et al.

(10) Patent No.: US 12,621,860 B2
(45) Date of Patent: May 5, 2026

(54) INTER-USER-EQUIPMENT COORDINATION FOR SIDELINK SCHEDULING USING MULTIPLE TIME-FREQUENCY OCCASIONS

(71) Applicant: QUALCOMM Incorporated, San Diego, CA (US)

(72) Inventors: Qing Li, Princeton Junction, NJ (US); Junyi Li, Fairless Hills, PA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 600 days.

(21) Appl. No.: 17/657,238

(22) Filed: Mar. 30, 2022

(65) Prior Publication Data

US 2023/0319881 A1      Oct. 5, 2023

(51) Int. Cl.
| | |
|---|---|
| *H04W 74/0816* | (2024.01) |
| *H04W 72/0446* | (2023.01) |
| *H04W 72/0453* | (2023.01) |
| *H04W 74/08* | (2009.01) |
| *H04W 92/18* | (2009.01) |

(52) U.S. Cl.
CPC ... *H04W 74/0816* (2013.01); *H04W 72/0446* (2013.01); *H04W 72/0453* (2013.01); *H04W 74/0866* (2013.01); *H04W 92/18* (2013.01)

(58) Field of Classification Search
CPC ......... H04W 74/0816; H04W 72/0446; H04W 72/0453; H04W 74/0866; H04W 92/18; H04W 16/14; H04W 74/0808; H04W 72/25; H04W 76/28; H04W 72/02
See application file for complete search history.

(56) References Cited

U.S. PATENT DOCUMENTS

| | | | |
|---|---|---|---|
| 2019/0174440 A1* | 6/2019 | Kwak | H04W 56/0015 |
| 2019/0182643 A1* | 6/2019 | Kim | H04W 4/40 |

(Continued)

FOREIGN PATENT DOCUMENTS

| | | | |
|---|---|---|---|
| WO | WO-2021207473 A1 | 10/2021 | |
| WO | WO-2021241958 A1 * | 12/2021 | H04W 72/02 |
| WO | WO-2022028409 A1 | 2/2022 | |

OTHER PUBLICATIONS

Apple: "Inter-UE Coordination for Mode 2 Resource Allocation", 3GPP TSG RAN WG1 #104-e, R1-2101358, e-Meeting, Jan. 25-Feb. 5, 2021, XP051971026, pp. 1-8, Sections 1-2, Section 2, Feb. 5, 2021 (Feb. 5, 2021).

(Continued)

*Primary Examiner* — Saumit Shah
(74) *Attorney, Agent, or Firm* — Harrity & Harrity LLP

(57) ABSTRACT

Various aspects of the present disclosure generally relate to wireless communication. In some aspects, a first user equipment (UE) may receive, from a second UE, an inter-UE coordination (IUC) communication indicating multiple time-frequency occasions for at least one of a sidelink data communication or a sidelink feedback communication, the multiple time-frequency occasions being based at least in part on one or more parameters. The first UE may transmit, to the second UE or another UE, the sidelink data communication or the sidelink feedback communication using at least one time-frequency occasion of the multiple time-frequency occasions. Numerous other aspects are provided.

30 Claims, 14 Drawing Sheets

1000 ⟶

1010 ~ Receive, from a second UE, an inter-UE coordination (IUC) communication indicating multiple time-frequency occasions for at least one of a sidelink data communication or a sidelink feedback communication, the multiple time-frequency occasions being based at least in part on one or more parameters 1020 ~ Transmit, to the second UE or another UE, the sidelink data communication or the sidelink feedback communication using at least one time-frequency occasion of the multiple time-frequency occasions

(56) References Cited

U.S. PATENT DOCUMENTS

| | | | | |
|---|---|---|---|---|
| 2020/0119849 | A1* | 4/2020 | Su | H04B 7/026 |
| 2021/0195637 | A1 | 6/2021 | Xue et al. | |
| 2022/0030575 | A1* | 1/2022 | Farag | H04L 5/0053 |
| 2022/0094488 | A1* | 3/2022 | Matsumura | H04L 5/0032 |
| 2022/0095280 | A1* | 3/2022 | Farag | H04W 72/23 |
| 2023/0239900 | A1* | 7/2023 | Park | H04L 1/1607 |
| | | | | 370/329 |
| 2024/0155654 | A1* | 5/2024 | Panteleev | H04L 5/0037 |
| 2024/0155666 | A1* | 5/2024 | Khoryaev | H04W 72/20 |
| 2024/0224297 | A1* | 7/2024 | Shin | H04W 76/14 |
| 2024/0251302 | A1* | 7/2024 | Zhang | H04W 72/40 |
| 2024/0414743 | A1* | 12/2024 | Selvanesan | H04W 76/14 |

OTHER PUBLICATIONS

International Search Report and Written Opinion - PCT/US2023/063317 - ISA/EPO - 2023-05-30 (2202939WO).

* cited by examiner

400

PSCCH
415

PSSCH
420

PSFCH
425

SCI
430

TB(s) with data
435

SL Feedback
440

UE
405-2

UE
405-1

Sidelink channels
410

622
Determine that a condition
has been satisfied for
transmitting IUC Indication 624
IUC Indication UE 120e UE 120a

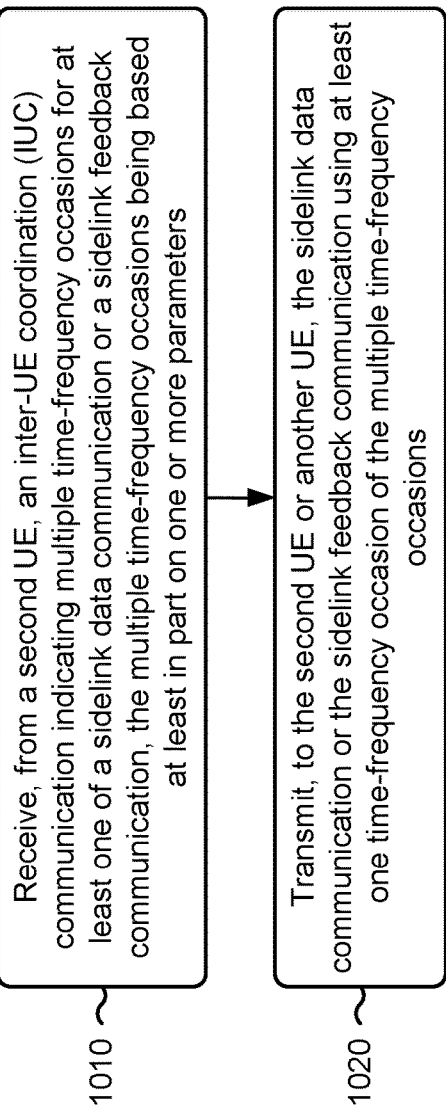

1010

Receive, from a second UE, an inter-UE coordination (IUC) communication indicating multiple time-frequency occasions for at least one of a sidelink data communication or a sidelink feedback communication, the multiple time-frequency occasions being based at least in part on one or more parameters

1020

Transmit, to the second UE or another UE, the sidelink data communication or the sidelink feedback communication using at least one time-frequency occasion of the multiple time-frequency occasions

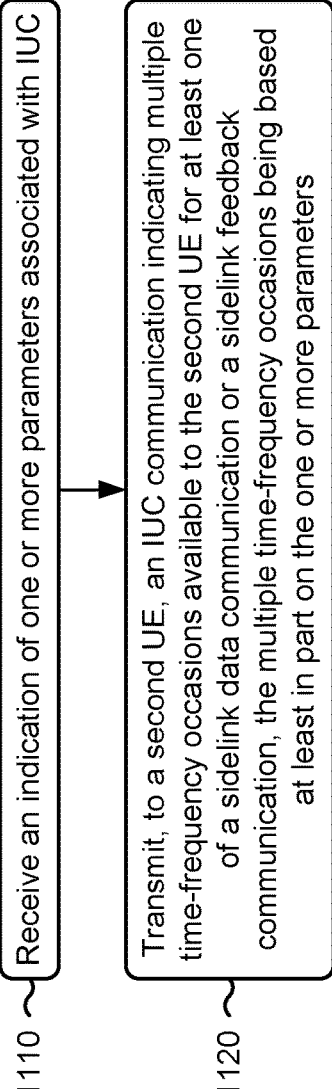

1110   Receive an indication of one or more parameters associated with IUC

1120   Transmit, to a second UE, an IUC communication indicating multiple time-frequency occasions available to the second UE for at least one of a sidelink data communication or a sidelink feedback communication, the multiple time-frequency occasions being based at least in part on the one or more parameters

INTER-USER-EQUIPMENT COORDINATION FOR SIDELINK SCHEDULING USING MULTIPLE TIME-FREQUENCY OCCASIONS

FIELD OF THE DISCLOSURE

Aspects of the present disclosure generally relate to wireless communication and specifically, to techniques and apparatuses for inter-user-equipment (UE) coordination for sidelink scheduling using multiple time-frequency occasions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some cases, such as in a shared or unlicensed frequency band, a user equipment (UE) may contend against other devices (for example, other UEs or other wireless communication devices) for channel access before transmitting on a shared or unlicensed channel to reduce or prevent collisions on the shared or unlicensed channel. To contend for channel access, the UE may perform a channel access procedure, such as a listen-before-talk (LBT) procedure or another type of channel access procedure, for shared or unlicensed frequency band channel access. The channel access procedure may be performed to determine whether the physical channel (for example, the radio resources of the channel) are free to use or are busy (for example, in use by another wireless communication device). The channel access procedure may include sensing or measuring the physical channel during a channel access gap (which may also be referred to as a contention window (CW)) and determining whether the shared or unlicensed channel is free or busy based at least in part on the signals sensed or measured on the physical channel (for example, based at least in part on whether the measurement satisfies a threshold). If the UE determines that the channel access procedure was successful, the UE may perform one or more transmissions on the shared or unlicensed channel during a transmission opportunity, which may extend for a channel occupancy time (COT).

In some cases, a first UE may exchange inter-UE coordination (IUC) communications with a second UE to identify time-frequency resources to be used to transmit a sidelink communication. Resource utilization associated with a sidelink unlicensed band (for example, whether a UE is able to transmit using given resources) may be impacted by a success rate of a channel access procedure, such as the LBT procedure. Therefore, whether a UE is able to transmit using given radio resources may not be deterministic or predictable because whether the UE is able to transmit using the given radio resources is based at least in part on the UE successfully performing the channel access procedure. Therefore, it may be difficult to determine or predict when a UE will be enabled to transmit a sidelink communication, feedback communication, or retransmission using an unlicensed or shared sidelink frequency band because of the unpredictable nature of the channel access procedure, such as the LBT procedure.

In an IUC procedure, a transmitting UE may receive an IUC information communication indicating a single time-frequency occasion for an initial transmission of a sidelink communication. If the transmitting UE is unable to transmit during the single time-frequency occasion (for example, based on a result of the channel access procedure indicating that the time-frequency occasion is busy), then the transmitting UE may delay a transmission of the sidelink communication until a time-frequency occasion associated with a retransmission of the sidelink communication (for example, as indicated by the IUC information communication). This results in additional latency associated with the sidelink communication. Additionally, this may result in a sidelink communication not being transmitted (for example, being dropped) because of an expiration of a packet delay budget (PDB) associated with the sidelink communication. Similarly, the IUC information communication may indicate a single time-frequency occasion for a feedback communication associated with the sidelink communication. If the receiving UE is unable to transmit using the single time-frequency occasion, then the receiving UE may be unable to transmit the feedback communication, resulting in the transmitting UE or a network entity being unable to determine if the sidelink communication was successfully decoded by the receiving UE. As a result, an IUC procedure may be associated with low reliability in an unlicensed or shared sidelink frequency band because of the non-deterministic or unpredictability of the channel access procedure.

SUMMARY

Some aspects described herein relate to a first user equipment (UE) for wireless communication. The first UE may include at least one memory and at least one processor communicatively coupled with the at least one memory. The at least one processor may be configured to cause the first UE to receive, from a second UE, an inter-UE coordination (IUC) communication indicating multiple time-frequency occasions for at least one of a sidelink data communication or a sidelink feedback communication, the multiple time-frequency occasions being based at least in part on one or more parameters. The at least one processor may be configured to cause the first UE to transmit, to the second UE or another UE, the sidelink data communication or the sidelink feedback communication using at least one time-frequency occasion of the multiple time-frequency occasions.

Some aspects described herein relate to a first UE for wireless communication. The first UE may include at least one memory and at least one processor communicatively coupled with the at least one memory. The at least one processor may be configured to cause the first UE to receive an indication of one or more parameters associated with IUC. The at least one processor may be configured to cause the first UE to transmit, to a second UE, an IUC communication indicating multiple time-frequency occasions available to the second UE for at least one of a sidelink data communication or a sidelink feedback communication, the multiple time-frequency occasions being based at least in part on the one or more parameters.

Some aspects described herein relate to a method of wireless communication performed by a first UE. The method may include receiving, from a second UE, an IUC communication indicating multiple time-frequency occasions for at least one of a sidelink data communication or a sidelink feedback communication, the multiple time-frequency occasions being based at least in part on one or more parameters. The method may include transmitting, to the second UE or another UE, the sidelink data communication or the sidelink feedback communication using at least one time-frequency occasion of the multiple time-frequency occasions.

Some aspects described herein relate to a method of wireless communication performed by a first UE. The method may include receiving an indication of one or more parameters associated with IUC. The method may include transmitting, to a second UE, an IUC communication indicating multiple time-frequency occasions available to the second UE for at least one of a sidelink data communication or a sidelink feedback communication, the multiple time-frequency occasions being based at least in part on the one or more parameters.

Some aspects described herein relate to a non-transitory computer-readable medium that stores a set of instructions for wireless communication by a first UE. The set of instructions, when executed by one or more processors of the first UE, may cause the first UE to receive, from a second UE, an IUC communication indicating multiple time-frequency occasions for at least one of a sidelink data communication or a sidelink feedback communication, the multiple time-frequency occasions being based at least in part on one or more parameters. The set of instructions, when executed by one or more processors of the first UE, may cause the first UE to transmit, to the second UE or another UE, the sidelink data communication or the sidelink feedback communication using at least one time-frequency occasion of the multiple time-frequency occasions.

Some aspects described herein relate to a non-transitory computer-readable medium that stores a set of instructions for wireless communication by a first UE. The set of instructions, when executed by one or more processors of the UE, may cause the first UE to receive an indication of one or more parameters associated with IUC. The set of instructions, when executed by one or more processors of the first UE, may cause the first UE to transmit, to a second UE, an IUC communication indicating multiple time-frequency occasions available to the second UE for at least one of a sidelink data communication or a sidelink feedback communication, the multiple time-frequency occasions being based at least in part on the one or more parameters.

Some aspects described herein relate to a first apparatus for wireless communication. The first apparatus may include means for receiving, from a second apparatus, an IUC communication indicating multiple time-frequency occasions for at least one of a sidelink data communication or a sidelink feedback communication, the multiple time-frequency occasions being based at least in part on one or more parameters. The first apparatus may include means for transmitting, to the second apparatus or another apparatus, the sidelink data communication or the sidelink feedback communication using at least one time-frequency occasion of the multiple time-frequency occasions.

Some aspects described herein relate to a first apparatus for wireless communication. The first apparatus may include means for receiving an indication of one or more parameters associated with IUC. The first apparatus may include means for transmitting, to a second apparatus, an IUC communication indicating multiple time-frequency occasions available to the second apparatus for at least one of a sidelink data communication or a sidelink feedback communication, the multiple time-frequency occasions being based at least in part on the one or more parameters, Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 8 is a diagram illustrating an example associated with time-duplexed time-frequency occasions for IUC using multiple time-frequency occasions, in accordance with the present disclosure.

FIG. 10 is a flowchart illustrating an example process performed, for example, by a first UE, associated with IUC for sidelink scheduling using multiple time-frequency occasions, in accordance with the present disclosure.

FIG. 11 is a flowchart illustrating an example process performed, for example, by a first UE, associated with IUC for sidelink scheduling using multiple time-frequency occasions, in accordance with the present disclosure.

DETAILED DESCRIPTION

Figure 1:
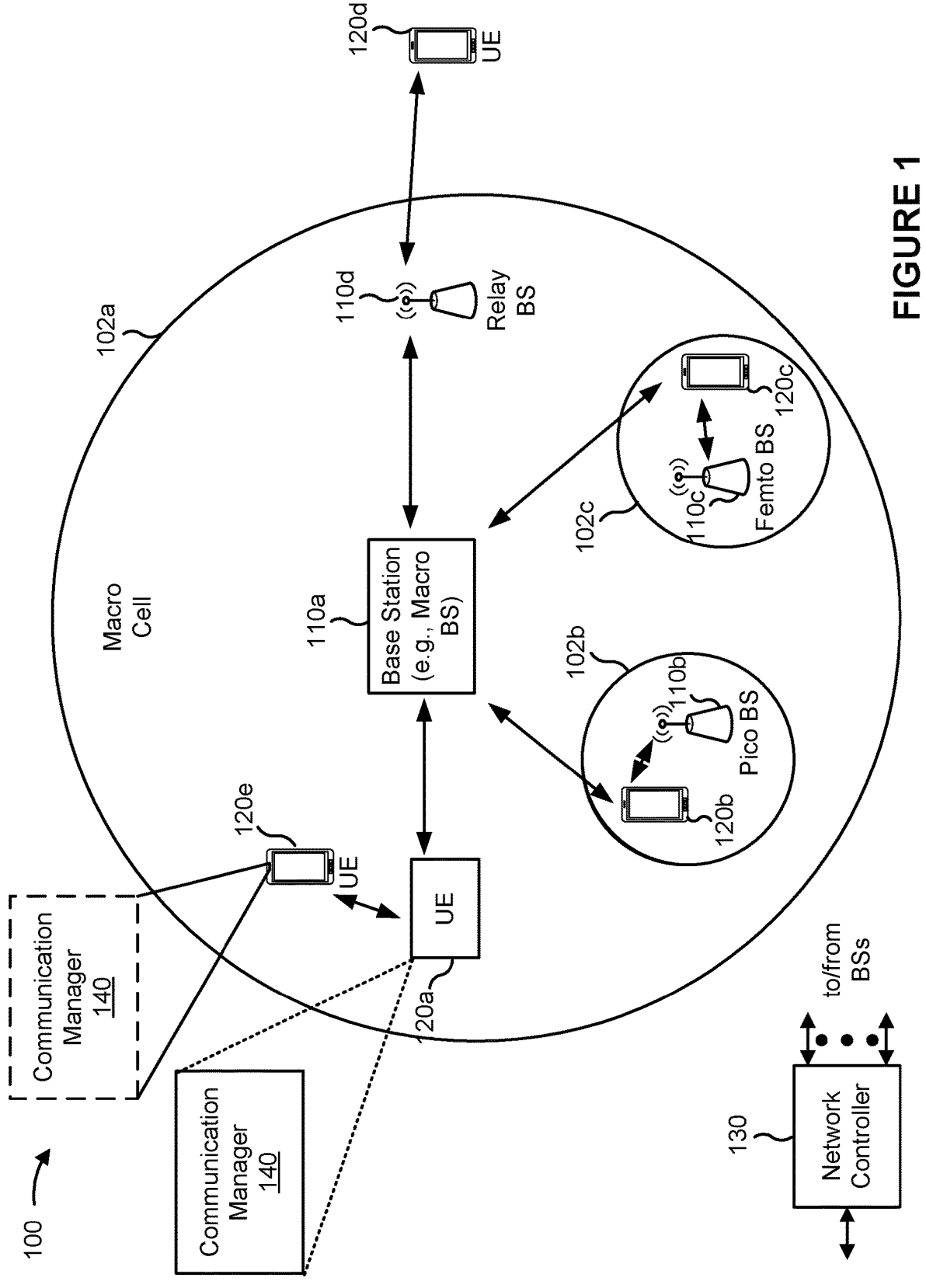
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to inter-user-equipment (inter-UE) coordination for sidelink scheduling using multiple time-frequency occasions. Some aspects more specifically relate to a first UE transmitting, to a second UE, an inter-UE coordination (IUC) communication (for example, an IUC information communication) indicating multiple time-frequency occasions for a sidelink data communication or a sidelink feedback communication. The multiple time-frequency occasions may be duplexed in the time domain, the frequency domain, or both the time domain and the frequency domain. In some aspects, the multiple time-frequency occasions may be separated in the time domain by a time gap. In some aspects, the multiple time-frequency occasions may be separated in the frequency domain by a frequency offset.

In some aspects, the multiple time-frequency occasions may be selected (for example, by the first UE or a network entity) based at least in part on one or more parameters, such as a quality of service (QoS) profile associated with the sidelink data communication, a listen-before-talk (LBT) procedure success rate, a quantity of consecutive LBT failures, a latency requirement associated with the sidelink data communication, or a channel busy ratio (CBR) of a sidelink channel, among other examples. In some aspects, the one or more parameters may be configured (for example, by a network entity or an original equipment manufacturer (OEM) configuration) for an IUC procedure associated with an unlicensed or shared sidelink frequency band. In some other aspects, the second UE may transmit, and the first UE may receive, an indication of the one or more parameters. For example, the second UE may transmit an indication of the one or more parameters in a sidelink medium access control (MAC) control element (MAC-CE) message. The MAC-CE message may activate or indicate the one or more parameters from a set of radio resource control (RRC) configured parameters for an IUC procedure associated with an unlicensed or shared sidelink frequency band. As another example, the second UE may transmit a dynamic indication of the one or more parameters in an IUC request communication.

Particular aspects of the subject matter described in this disclosure can be implemented to realize one or more of the following potential advantages. In some examples, the described techniques can be used to improve a reliability of sidelink communications (for example, data communications or feedback communications) that are associated with an IUC procedure in an unlicensed or shared sidelink frequency band. For example, the multiple time-frequency occasions may provide a transmitting UE with multiple opportunities to perform a channel access procedure, such as an LBT procedure. This improves a likelihood that the transmitting UE will be enabled to transmit a sidelink communication using one of the multiple time-frequency occasions. This may reduce a latency associated with the sidelink communication that would have otherwise been present if the transmitting UE were to experience an LBT failure and be required to delay a transmission of the sidelink communication until a time-frequency occasion associated with a retransmission of the sidelink communication. Additionally, this may improve a likelihood that the transmitting UE is enabled to transmit the sidelink communication prior to an expiration of a packet delay budget (PDB) associated with the sidelink communication.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110*d* (for example, a relay base station) may communicate with the BS 110*a* (for example, a macro base station) and the UE 120*d* in order to facilitate communication between the BS 110*a* and the UE 120*d*. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, a first UE 120 (for example, the UE 120a or the UE 120e) may include a communication manager 140. As described in more detail elsewhere herein, the communication manager 140 may receive, from a second UE, an IUC communication indicating multiple time-frequency occasions for at least one of a sidelink data communication or a sidelink feedback communication, the multiple time-frequency occasions being based at least in part on one or more parameters; and transmit, to the second UE or another UE, the sidelink data communication or the sidelink feedback communication using at least one time-frequency occasion of the multiple time-frequency occasions. Additionally or alternatively, the communication manager 140 may perform one or more other operations described herein.

Additionally or alternatively, as described in more detail elsewhere herein, the communication manager 140 may receive an indication of one or more parameters associated with IUC; and transmit, to a second UE, an IUC communication indicating multiple time-frequency occasions available to the second UE for at least one of a sidelink data communication or a sidelink feedback communication, the multiple time-frequency occasions being based at least in part on the one or more parameters. Additionally or alternatively, the communication manager 140 may perform one or more other operations described herein.

Figure 2:
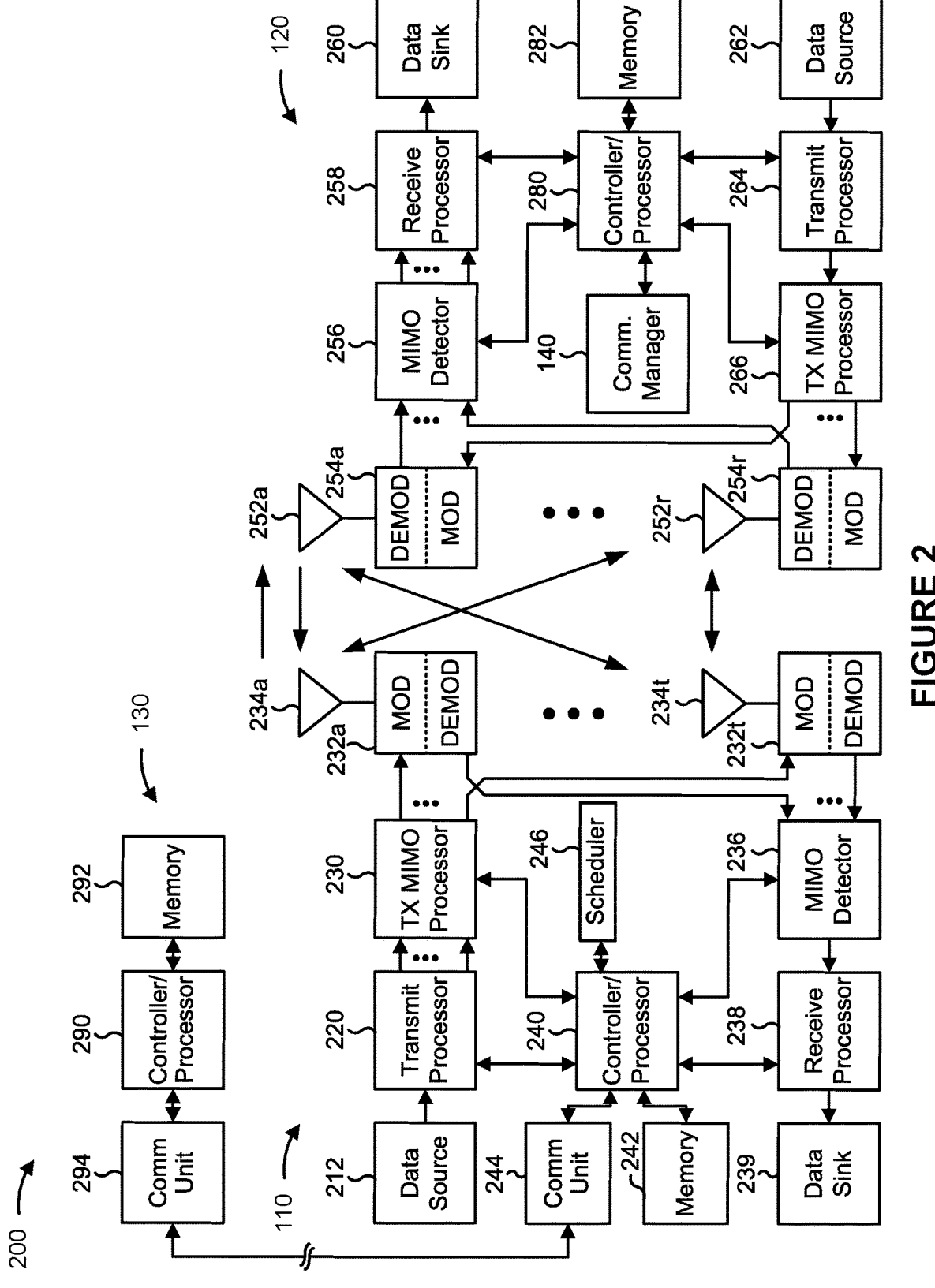
FIG. 2 is a diagram illustrating an example base station in communication with a user equipment (UE) in a wireless network in accordance with the present disclosure.

FIG. 2 is a diagram illustrating an example 200 of a base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with IUC for sidelink scheduling using multiple time-frequency occasions, as described in more detail elsewhere herein. For example, the controller/processor 240 of the base station 110, the controller/processor 280 of the UE 120, or any other component(s) of FIG. 2 may perform or direct operations of, for example, process 1000 of FIG. 10, process 1100 of FIG. 11, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 1000 of FIG. 10, process 1100 of FIG. 11, or other processes as described herein. In some examples, executing instructions may include running the instructions, converting the instructions, compiling the instructions, or interpreting the instructions, among other examples.

In some aspects, a first UE 120 includes means for receiving, from a second UE, an IUC communication indicating multiple time-frequency occasions for at least one of a sidelink data communication or a sidelink feedback communication, the multiple time-frequency occasions being based at least in part on one or more parameters; or means for transmitting, to the second UE or another UE, the sidelink data communication or the sidelink feedback communication using at least one time-frequency occasion of the multiple time-frequency occasions. Additionally or alternatively, the first UE 120 includes means for receiving an indication of one or more parameters associated with IUC; or means for transmitting, to a second UE, an IUC communication indicating multiple time-frequency occasions available to the second UE for at least one of a sidelink data communication or a sidelink feedback communication, the multiple time-frequency occasions being based at least in part on the one or more parameters. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station.

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as a central unit (CU), one or more distributed units (DUs), or one or more radio units (RUs)). In some examples, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
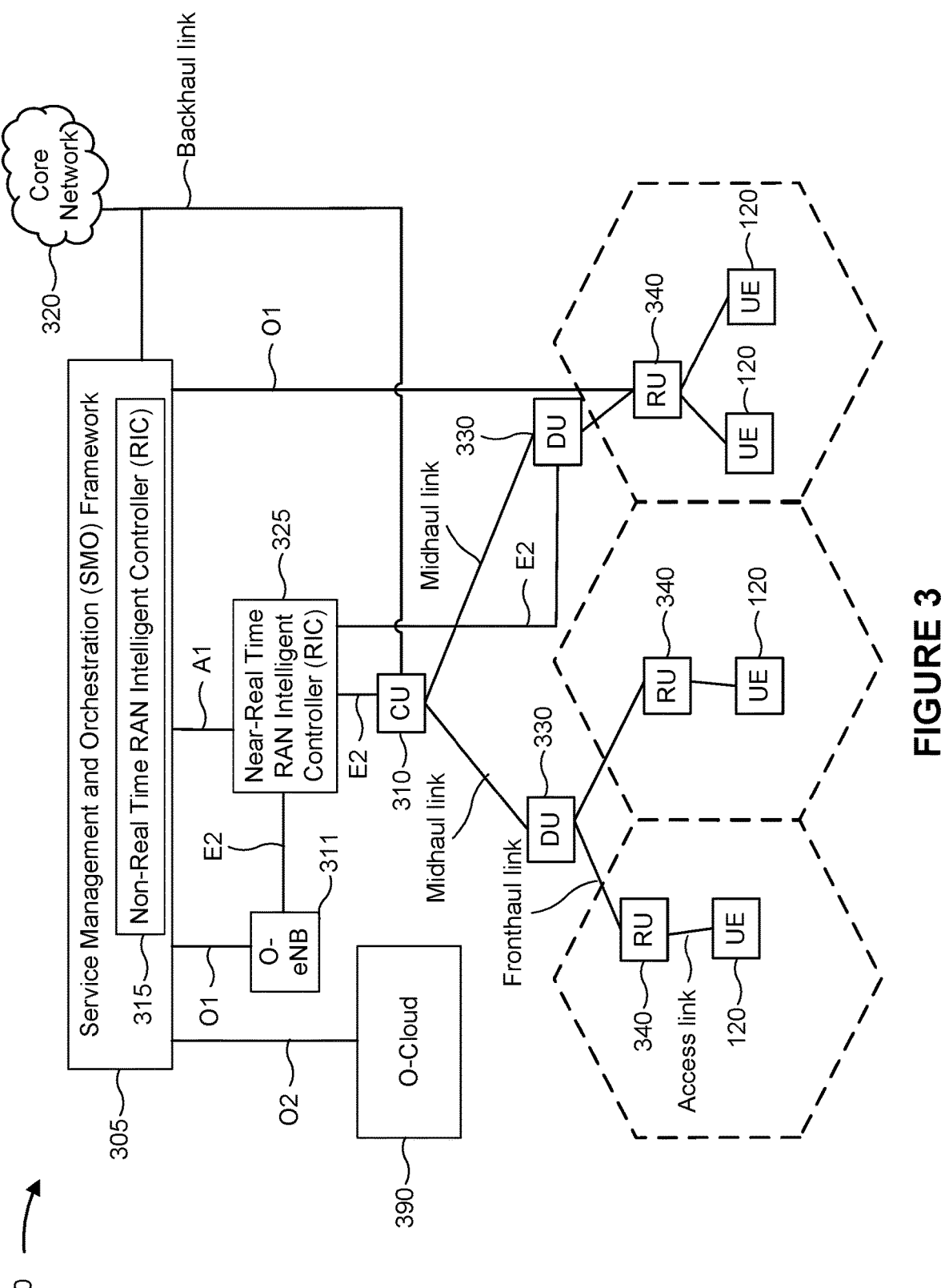
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include RRC functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which may also be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based at least in part on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
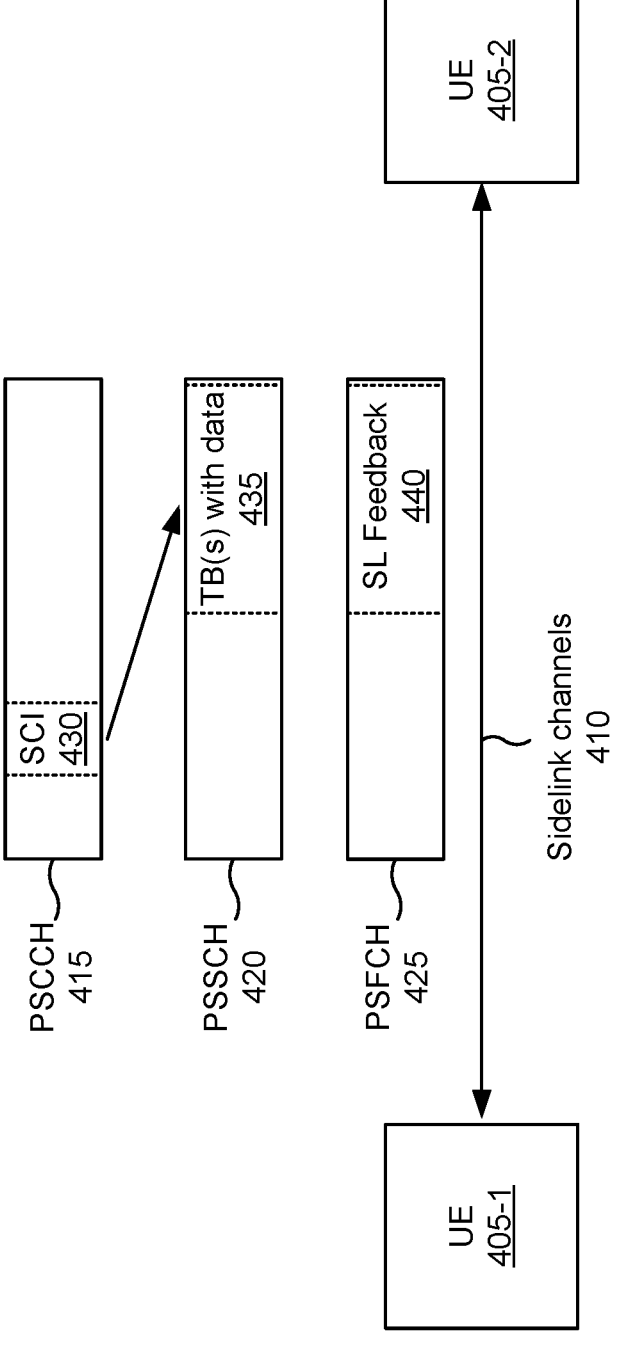
FIG. 4 is a diagram illustrating an example of sidelink communications, in accordance with the present disclosure.

FIG. 4 is a diagram illustrating an example of sidelink communications 400, in accordance with the present disclosure. As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (for example, which may include V2V communications, V2I communications, or V2P communications) or mesh networking. In some examples, the UEs 405 (for example, UE 405-1 or UE 405-2) may correspond to one or more other UEs described elsewhere herein, such as UE 120. In some examples, the one or more sidelink channels 410 may use a PC5 interface or may operate in a high frequency band (for example, the 5.9 GHz band). Additionally or alternatively, the UEs 405 may synchronize timing of transmission time intervals (TTIs) (for example, frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, or a physical sidelink feedback channel (PSFCH) 425. The PSCCH 415 may be used to communicate control information, similar to a physical downlink control channel (PDCCH) or a physical uplink control channel (PUCCH) used for cellular communications with a base station 110 via an access link or an access channel. The PSSCH 420 may be used to communicate data, similar to a physical downlink shared channel (PDSCH) or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (for example, time resources, frequency resources, or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (for example, acknowledgement or negative acknowledgement (ACK/ NACK) information), transmit power control (TPC), or a scheduling request (SR).

Although shown on the PSCCH 415, in some examples, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (for example, time resources, frequency resources, or spatial resources) on the PSSCH 420, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, or a modulation and coding scheme (MCS). The SCI-2 may include information associated with data transmissions on the PSSCH 420, such as a hybrid automatic repeat request (HARM) process ID, a new data indicator (NDI), a source identifier, a destination identifier, or a channel state information (CSI) report trigger.

In some examples, the one or more sidelink channels 410 may use resource pools. For example, a scheduling assignment (for example, included in SCI 430) may be transmitted in sub-channels using specific resource blocks (RBs) across time. In some examples, data transmissions (for example, on the PSSCH 420) associated with a scheduling assignment may occupy adjacent RBs in the same subframe as the scheduling assignment (for example, using frequency division multiplexing). In some examples, a scheduling assignment and associated data transmissions are not transmitted on adjacent RBs.

In some examples, a UE 405 may operate using a sidelink resource allocation mode (for example, Mode 1) where resource selection or scheduling is performed by a base station 110. For example, the UE 405 may receive a grant (for example, in downlink control information (DCI) or in a radio resource control (RRC) message, such as for configured grants) from the base station 110 for sidelink channel access or scheduling. In some examples, a UE 405 may operate using a sidelink resource allocation mode (for example, Mode 2) where resource selection or scheduling is performed by the UE 405 (for example, rather than a base station 110). In some examples, the UE 405 may perform resource selection or scheduling by sensing channel availability for transmissions. For example, the UE 405 may measure a received signal strength indicator (RSSI) parameter (for example, a sidelink-RSSI (S-RSSI) parameter) associated with various sidelink channels, may measure a reference signal received power (RSRP) parameter (for example, a PSSCH-RSRP parameter) associated with various sidelink channels, or may measure a reference signal received quality (RSRQ) parameter (for example, a PSSCH-RSRQ parameter) associated with various sidelink channels, and may select a channel for transmission of a sidelink communication based at least in part on the measurement(s).

Additionally or alternatively, the UE 405 may perform resource selection or scheduling using SCI 430 received in the PSCCH 415, which may indicate occupied resources or channel parameters. Additionally or alternatively, the UE 405 may perform resource selection or scheduling by determining a channel busy ratio (CBR) associated with various sidelink channels, which may be used for rate control (for example, by indicating a maximum quantity of resource blocks that the UE 405 can use for a particular set of subframes).

Additionally or alternatively, the UE 405 may perform listen-before-talk (LBT) for detecting if a channel is occupied by another device, which may be used for the UE 405 to determine to access the channel on a shared spectrum (for example, an unlicensed spectrum).

In the resource allocation mode where resource selection or scheduling is performed by a UE 405 (for example, Mode 2), the UE 405 may generate sidelink grants, and may transmit the grants in SCI 430. A sidelink grant may indicate, for example, one or more parameters (for example, transmission parameters) to be used for an upcoming sidelink transmission, such as one or more resource blocks to be used for the upcoming sidelink transmission on the PSSCH 420 (for example, for TBs 435), one or more subframes to be used for the upcoming sidelink transmission, or a modulation and coding scheme (MCS) to be used for the upcoming sidelink transmission. In some examples, a UE 405 may generate a sidelink grant that indicates one or more parameters for semi-persistent scheduling (SPS), such as a periodicity of a sidelink transmission. Additionally or alternatively, the UE 405 may generate a sidelink grant for event-driven scheduling, such as for an on-demand sidelink message.

Figure 5:
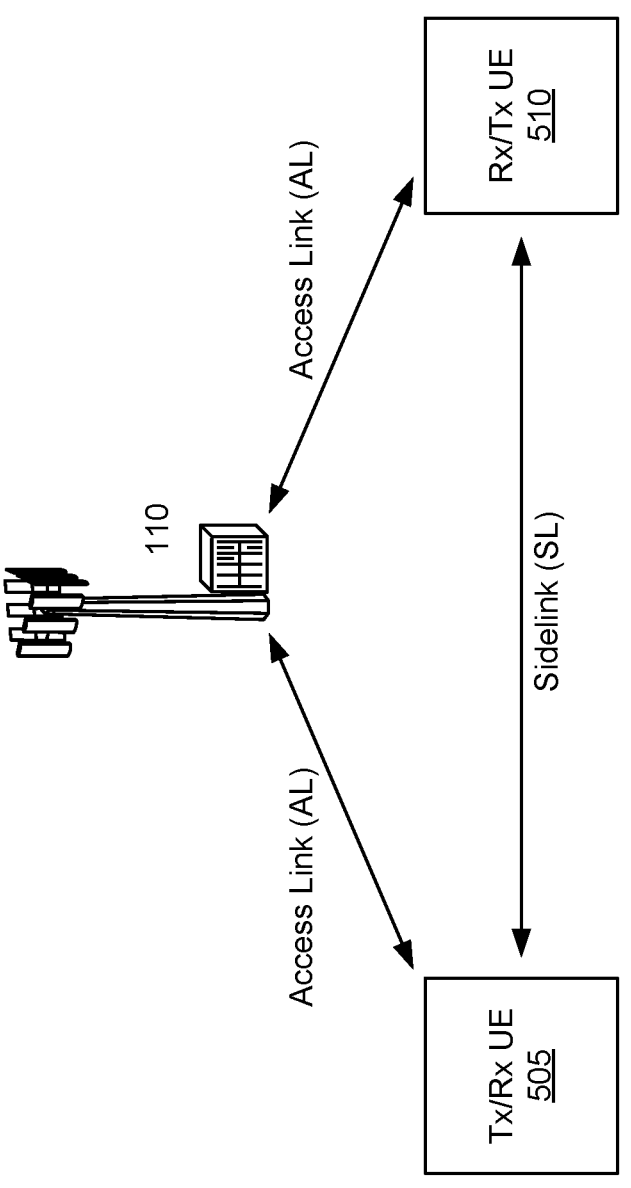
FIG. 5 is a diagram illustrating an example of sidelink communications and access link communications, in accordance with the present disclosure.

FIG. 5 is a diagram illustrating an example of sidelink communications and access link communications 500, in accordance with the present disclosure. As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally or alternatively, in some sidelink modes, the base station 110 may communicate with the Rx/Tx UE 510 via a second access link. The Tx/Rx UE 505 or the Rx/Tx UE 510 may correspond to one or more UEs described elsewhere herein, such as the UE 120 of FIG. 1. Thus, a direct link between UEs 120 (for example, via a PC5 interface) may be referred to as a sidelink, and a direct link between a base station 110 and a UE 120 (for example, via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

Figure 6A:
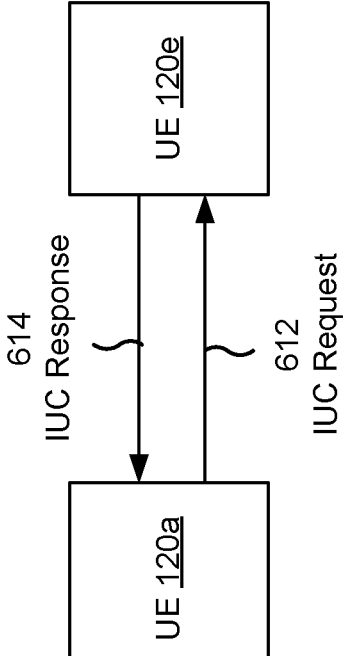
FIGS. 6A and 6B are diagrams illustrating examples of inter-UE coordination (IUC), in accordance with the present disclosure.
Figure 6B:
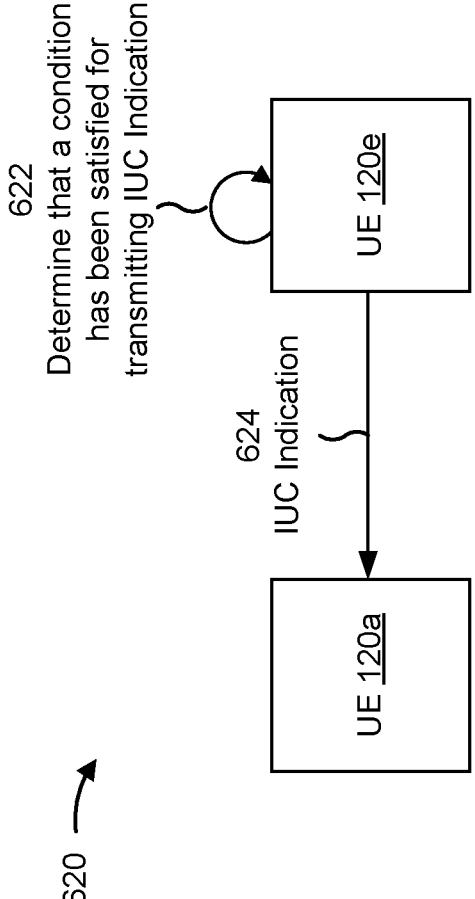

FIGS. 6A and 6B are diagrams illustrating examples of IUC 600, in accordance with the present disclosure. As shown in FIGS. 6A and 6B, a first UE (for example, UE 120a of FIG. 1) exchanges inter-UE coordination signaling with a second UE (for example, UE 120e of FIG. 1). The UE 120a and the UE 120e may operate in an in-coverage mode, a partial-coverage mode, or an out-of-coverage mode with a base station 110 or another type of network entity in the wireless network 100. The UE 120e may determine a set of sidelink resources that are available for a resource allocation or scheduling (for example, based on QoS, based on resource usage, based on channel measurement, based on network conditions, or based on another parameters). The UE 120e may determine the set of sidelink resources based at least in part on determining that the set of sidelink resources are to be selected or based at least in part on a request, referred to herein as an IUC response, received from the UE 120e.

FIG. 6A illustrates an example of request-based IUC 610 in which the UE 120e transmits an IUC response to the UE 120a based at least in part on the UE 120a transmitting (and the UE 120e receiving) an IUC request. For example, in a first operation 612, the UE 120a transmits (and the UE 120e receives) an IUC request, and in a second operation 614, the UE 120e transmits (and the UE 120a receives) an IUC response based at least in part on receiving the IUC request.

The UE 120a may determine to transmit the IUC request based at least in part on having data or control information to transmit to the UE 120e. For example, the UE 120a may have application information, data, voice, or another type of upper-layer information to transmit to the UE 120e, and the UE 120a may determine to transmit the IUC request to the UE 120e based at least in part on receiving the application information at a MAC layer or a modem of the UE 120a.

The IUC response may indicate one or more sidelink resources to assist the UE 120a with scheduling or allocating sidelink resources for transmission on a sidelink to the UE 120e. For example, the IUC response may indicate one or more sidelink time domain resources (for example, sidelink slots, sidelink mini-slots, sidelink symbols, among other examples) or one or more sidelink frequency domain resources (for example, sidelink subcarriers, sidelink resource blocks, or sidelink subchannels, among other examples). The sidelink resource(s) indicated in the IUC response may be preferred sidelink resource(s) for the sidelink transmission or non-preferred sidelink resource(s). "Preferred sidelink resource(s)" refers to sidelink resource(s) that are preferred by the UE 120e for the sidelink transmission. "Non-preferred sidelink resource(s)" refers to sidelink resource(s) that the UE 120a should avoid using for the sidelink transmission. The UE 120e may determine the sidelink resource(s) (for example, either preferred or non-preferred) based at least in part on a configuration for the UE 120e, based at least in part on results of one or more sidelink measurements, based at least in part on communication performance on the sidelink resource(s), or based at least in part on another factor.

The UE 120a may configure or generate the IUC request for supporting sidelink resource allocation or scheduling where multiple sidelink carriers or multiple sidelink BWPs associated to each sidelink carrier are configured or allocated for sidelink communication to the UE 120a or to the UE 120e. For example, the IUC request may indicate one or more of the sidelink carriers (for example, multiple frequency carriers that are configured or allocated for sidelink communication with carrier aggregation for the UE 120a or for the UE 120e) on which the UE 120e is to identify the sidelink resource(s). As another example, the IUC request may indicate one or more of the sidelink BWPs on one or more sidelink carriers respectively (for example, BWP(s) that are configured or allocated for sidelink communication for the UE 120a or for the UE 120e) in which the UE 120e is to identify the sidelink resource(s). As another example, the IUC request may indicate one or more sidelink resource pools (for example, sidelink resource pool(s) that are allocated for the configured or indicated sidelink carrier(s) or the configured or indicated sidelink BWP(s)) in which the UE 120e is to identify the sidelink resource(s). The one or more sidelink resource pools may include pools or groups of sidelink resources that are associated with respective sidelink resource pool identifiers. Each sidelink resource pool may include one or more sidelink time domain resources or one or more frequency domain resources. In some aspects, the UE 120 determines or generates the IUC request to include a combination of sidelink carrier(s), sidelink BWP(s), or sidelink resource pool(s).

The UE 120e may determine or generate the IUC response for supporting sidelink resource allocation or scheduling where multiple sidelink carriers or multiple sidelink BWPs associated to each sidelink carrier are configured or allocated for sidelink communication to the UE 120a or to the UE 120e. For example, the IUC response may indicate one or more sidelink time domain resources or one or more frequency domain resources (for example, a time-frequency occasion) in a sidelink carrier that was configured or indicated in the IUC request or selected by the UE 120e. As used herein, "time-frequency occasion" may refer to one or more time domain resources, one or more frequency domain resources, or a combination of one or more time domain resources and one or more frequency domain resources.

As another example, the IUC response may indicate one or more sidelink time domain resources or one or more frequency domain resources in a sidelink BWP on a sidelink carrier that was configured or indicated in the IUC request or selected by the UE 120e. As another example, the IUC response may indicate one or more sidelink time domain resources or one or more frequency domain resources in a sidelink resource pool within a sidelink BWP on a sidelink carrier that was configured or indicated in the IUC request or selected by the UE 120e.

Moreover, if the IUC request does not indicate a sidelink carrier, the UE 120a may configure or generate the IUC response to indicate the sidelink carrier, the sidelink BWP, and the sidelink resource pool in which the one or more sidelink time domain resources or one or more frequency domain resources are included. If the IUC request indicates a sidelink carrier but not a sidelink BWP, the UE 120a may configure or generate the IUC response to indicate the sidelink BWP on a sidelink carrier and the sidelink resource pool in which the one or more sidelink time domain resources or one or more frequency domain resources are included. Here, the UE 120a may omit the indication of the sidelink carrier (because the UE 120e already knows the sidelink carrier with the configuration) from the IUC response, which reduces the size of the IUC response and conserves network resources. If the IUC request indicates a selected sidelink carrier and a selected sidelink BWP but not a sidelink resource pool, the UE 120a may configure or generate the IUC response to indicate a sidelink resource pool in which the one or more sidelink time domain resources or one or more frequency domain resources are included. Here, the UE 120a may omit the indication of the sidelink carrier and the sidelink BWP (because the UE 120e already knows the sidelink carrier and the sidelink BWP with the configuration) from the IUC response, which reduces the size of the IUC response and conserves network resources.

In some examples, the UE 120a transmits the IUC request in a sidelink communication, such as a MAC-CE communication or an SCI communication, among other examples. The MAC-CE communication may include a MAC-CE format that is specific to IUC requests. The SCI communication may include an SCI part 1 (SCI-1) communication, an SCI part 2 (SCI-2) communication, or another type of SCI communication.

In some examples, the UE 120e transmits the IUC response in a sidelink communication, such as a MAC-CE communication or an SCI communication, among other examples. The MAC-CE communication may include a MAC-CE format that is specific to IUC responses, such as the MAC-CE format described in connection with FIG. 12. The SCI communication may include an SCI-1 communication, an SCI-2 communication, or another type of SCI communication.

In some aspects, the IUC request and IUC response may be exchanged in sidelink resource pool within a sidelink BWP on a sidelink carrier which is same as the sidelink carrier, the sidelink BWP, and the sidelink resource pool for the preferred or non-preferred resources to be used for the UE 120a's transmission(s). In such examples, no indication of a sidelink carrier, a sidelink BWP, or a sidelink resource pool is indicated in either IUC request or IUC response.

In some examples, the IUC request and IUC response may be exchanged in a sidelink resource pool within a sidelink BWP on a sidelink carrier where at least one of the sidelink carrier, the sidelink BWP, or the sidelink resource pool is different from the sidelink carrier, the sidelink BWP, or the sidelink resource pool determined or selected by either the UE 120a (for example, a sidelink carrier, a sidelink BWP, or a sidelink resource pool selected and indicated in the IUC request) or the UE 120e (for example, a sidelink carrier, a sidelink BWP, or a sidelink resource pool selected and indicated in the IUC response) for the preferred or non-preferred resources to be used for the UE 120a's transmission(s). For example, the IUC request and IUC response may be exchanged on an anchor sidelink carrier (for example, with the IUC request and response on an FR1 carrier or a licensed carrier and the preferred or non-preferred resources on an FR2 carrier or unlicensed carrier, among other examples). For example, the IUC request and IUC response may be exchanged within a common or initial sidelink BWP (for example, with the IUC request and response within a small sidelink BWP and the preferred or non-preferred resources within a large sidelink BWP). For example, the IUC request and IUC response may be exchanged in a resource pool configured or allocated for IUC operations.

FIG. 6B illustrates an alternative example of trigger-based IUC 620 in which the UE 120e transmits an IUC indication to the UE 120a based at least in part on a condition being satisfied. For example, in a third operation 622, the UE 120e determines that an IUC response condition has been satisfied for transmitting IUC information and, in a fourth operation 624, the UE 120e transmits (and the UE 120a receives) an IUC response based at least in part on the UE 120a determining that the IUC response condition has been satisfied.

The UE 120e may transmit the IUC indication in the trigger-based IUC 620 to provide preferred or non-preferred sidelink resource(s) to the UE 120e for sidelink resource allocation or scheduling. The condition for transmitting IUC information may include, for example, one or more sidelink measurements satisfying one or more associated thresholds such as a sidelink RSRP measurement threshold, a sidelink RSRQ measurement threshold, a sidelink CQI measurement threshold, a sidelink signal-to-interference-plus-noise ratio (SINR) measurement threshold, a sidelink channel busy ratio (CBR) measurement threshold, a latency measurement threshold, a pathloss measurement threshold, or another type of measurement threshold. As another example, the condition for transmitting IUC indication may include a change in a preferred sidelink carrier for the UE 120e. As another example, the IUC indication condition may include a change in a preferred sidelink BWP for the UE 120e. As another example, the condition for transmitting IUC indication may include a change in a preferred sidelink resource pool for the UE 120. As another example, the condition for transmitting IUC information may include an indication of whether the UE 120e is available for receiving one or more transmissions on one or more resources in a resource pool within a sidelink BWP on a sidelink carrier. In some aspects, the 120e may transmit the IUC information based at least in part on determining that a plurality of conditions for transmitting IUC indication have been satisfied.

The UE 120a may select one or more sidelink resources for the sidelink transmission (which may include a unicast sidelink transmission, for example) to the UE 120e based at least in part on the sidelink resource(s) indicated in an IUC response (for example, the IUC response shown in FIG. 6A) or an IUC indication (for example, the IUC indication shown in FIG. 6B). In this way, the UE 120a selects preferred (or avoids non-preferred) sidelink resource(s) indicated in the IUC response or IUC indication, which may reduce collisions between the UE 120a and the UE 120e (half duplex issue for UE 120e) or collisions with other UE(s) 120 (hidden node issue for UE 120e) or may reduce a power consumption for the UE 120a or the UE 120e (for example, due to fewer retransmissions as a result of fewer collisions), among other examples. The IUC response in FIG. 6A and the IUC indication in FIG. 6B may be referred to herein as "IUC information" communications.

Although FIGS. 6A and 6B show a single UE (for example, the UE 120e) transmitting an IUC response or an IUC indication to the UE 120a, in some aspects, one or more other UEs 120 may transmit IUC responses or IUC indications to the UE 120a to assist the UE 120a in selecting sidelink resource(s) for groupcast or broadcast sidelink transmissions. In this way, the UE 120a may receive the IUC responses or IUC indications and may use that information to select sidelink resources that reduce the likelihood of conflict or collision with the UE 120 or other UEs 120 as many as possible.

In some cases, in a shared or unlicensed frequency band, a UE 120 may contend against other devices (for example, other UEs or other wireless communication devices) for channel access before transmitting on a shared or unlicensed channel to reduce or prevent collisions on the shared or unlicensed channel. To contend for channel access, the UE 120 may perform a channel access procedure, such as an LBT procedure or another type of channel access procedure, for shared or unlicensed frequency band channel access. The channel access procedure may be performed to determine whether the physical channel (for example, the radio resources of the channel) is free to use or is busy (for example, in use by another wireless communication device such as a UE, an internet of thing (IoT) device, or a wireless local area network (WLAN) device, among other examples). The channel access procedure may include sensing or measuring the physical channel (for example, performing an RSRP measurement, detecting an energy level, or performing another type of measurement) during a channel access gap (which may also be referred to as a contention window (CW)) and determining whether the shared or unlicensed channel is free or busy based at least in part on the signals sensed or measured on the physical channel (for example, based at least in part on whether the measurement satisfies a threshold). If the UE 120 determines that the channel access procedure was successful, the UE 120 may perform one or more transmissions on the shared or unlicensed channel during a transmission opportunity (TXOP), which may extend for a channel occupancy time (COT).

In some cases, the UE 120 may perform communications via a shared or unlicensed band with a network entity via the Uu interface. For example, the UE 120 may use CAT4 or CAT2 LBT based channel accessing (for example, as defined, or otherwise fixed, by a wireless communication standard, such as the 3GPP) for downlink and uplink communications with the network entity. In some cases, the network entity may schedule resources for the PDSCH for up to four consecutive slots using DCI. In some cases, the network entity may trigger retransmission of a feedback communication, such as a HARQ-ACK feedback communication. In some cases, the network entity may schedule multiple slots for the PUSCH using a single uplink grant. In some cases, in NR unlicensed (NR-U) uplink, the UE 120 may select a HARQ identifier (HARQ ID), redundancy version (RV), or a new data indicator (NDI), and may report the HARQ ID, RV, or NDI as part of the uplink control information (UCI) in each configured uplink PUSCH.

Resource utilization associated with a sidelink unlicensed band (for example, whether a UE is able to transmit using given resources) may be mainly impacted by a success rate of a channel access procedure, such as the LBT procedure. Therefore, whether a UE is able to transmit using given radio resources may not be deterministic or predictable because whether the UE is able to transmit using the given radio resources is based at least in part on the UE successfully performing the channel access procedure. For example, a transmitting UE may attempt to transmit a sidelink communication in a first slot. However, the transmitting UE may be unable to transmit in the first slot based on the channel access procedure indicating that resources to be used by the transmitting UE are busy (for example, are in use by another wireless communication device). For example, the transmitting UE may be unable to transmit the sidelink communication until the next resources allocated to transmission. Similarly, a receiving UE (for example, that is receiving the sidelink communication) may attempt to transmit a negative acknowledgement (NACK) feedback associated with the sidelink communication based on failing to decode the sidelink communication. However, the receiving UE may attempt and fail to transmit the feedback one or more times based on performing the channel access procedure, in a similar manner as described above. The transmitting UE may receive the NACK communication and attempt to transmit a retransmission of the sidelink communication to the receiving UE. However, in a similar manner as described above, the transmitting UE may attempt and fail to transmit the retransmission of the sidelink communication one or more times based on performing the channel access procedure. Therefore, it may be difficult to determine or predict when a UE will be enabled to transmit a sidelink communication, feedback communication, or retransmission using an unlicensed or shared sidelink frequency band because of the unpredictable nature of the channel access procedure, such as the LBT procedure.

As described elsewhere herein in more detail, in an IUC procedure, a transmitting UE may receive an IUC information communication indicating a single time-frequency occasion for an initial transmission of a sidelink communication. If the transmitting UE is unable to transmit during the single time-frequency occasion (for example, based on a result of the channel access procedure indicating that the time-frequency occasion is busy), then the transmitting UE may delay a transmission of the sidelink communication until a time-frequency occasion associated with a retransmission of the sidelink communication (for example, as indicated by the IUC information communication). This results in additional latency associated with the sidelink communication. Additionally, this may result in a sidelink communication not being transmitted (for example, being dropped) because of an expiration of a packet delay budget (PDB) associated with the sidelink communication. Similarly, the IUC information communication may indicate a single time-frequency occasion for a feedback communication associated with the sidelink communication. If the receiving UE is unable to transmit using the single time-frequency occasion, then the receiving UE may be unable to transmit the feedback communication, resulting in the transmitting UE or a network entity being unable to determine if the sidelink communication was successfully decoded by the receiving UE. As a result, an IUC procedure may be associated with low reliability in an unlicensed or shared sidelink frequency band because of the non-deterministic or unpredictability of the channel access procedure.

Various aspects relate generally to IUC for sidelink scheduling using multiple time-frequency occasions. Some aspects more specifically relate to a first UE transmitting, to a second UE, an IUC communication (for example, an IUC information communication) indicating multiple time-frequency occasions for a sidelink data communication or a sidelink feedback communication. The multiple time-frequency occasions may be duplexed in the time domain, the frequency domain, or both the time domain and the frequency domain. In some aspects, the multiple time-frequency occasions may be separated in the time domain by a time gap. In some aspects, the multiple time-frequency occasions may be separated in the frequency domain by a frequency offset.

In some aspects, the multiple time-frequency occasions may be selected (for example, by the first UE or a network entity) based at least in part on one or more parameters, such as a QoS profile associated with the sidelink data communication, an LBT procedure success rate, a quantity of consecutive LBT failures, a latency requirement associated with the sidelink data communication, or a CBR, among other examples. In some aspects, the one or more parameters may be configured (for example, by a network entity or an original equipment manufacturer (OEM) configuration) for an IUC procedure associated with an unlicensed or shared sidelink frequency band. In some other aspects, the second UE may transmit, and the first UE may receive, an indication of the one or more parameters. For example, the second UE may transmit an indication of the one or more parameters in a MAC-CE message. The MAC-CE message may activate or indicate the one or more parameters from a set of RRC configured parameters for an IUC procedure associated with an unlicensed or shared sidelink frequency band. As another example, the second UE may transmit an indication of the one or more parameters in an IUC request communication.

Particular aspects of the subject matter described in this disclosure can be implemented to realize one or more of the following potential advantages. In some examples, the described techniques can be used to improve a reliability of sidelink communications (for example, data communications or feedback communications) that are associated with an IUC procedure in an unlicensed or shared sidelink frequency band. For example, the multiple time-frequency occasions may provide a transmitting UE with multiple opportunities to perform a channel access procedure, such as an LBT procedure. This improves a likelihood that the transmitting UE will be enabled to transmit a sidelink communication using one of the multiple time-frequency occasions. This may reduce a latency associated with the sidelink communication that would have otherwise been present if the transmitting UE were to experience an LBT failure and be required to delay a transmission of the sidelink communication until a time-frequency occasion associated with a retransmission of the sidelink communication. Additionally, this may improve a likelihood that the transmitting UE is enabled to transmit the sidelink communication prior to an expiration of a PDB associated with the sidelink communication.

Figure 7:
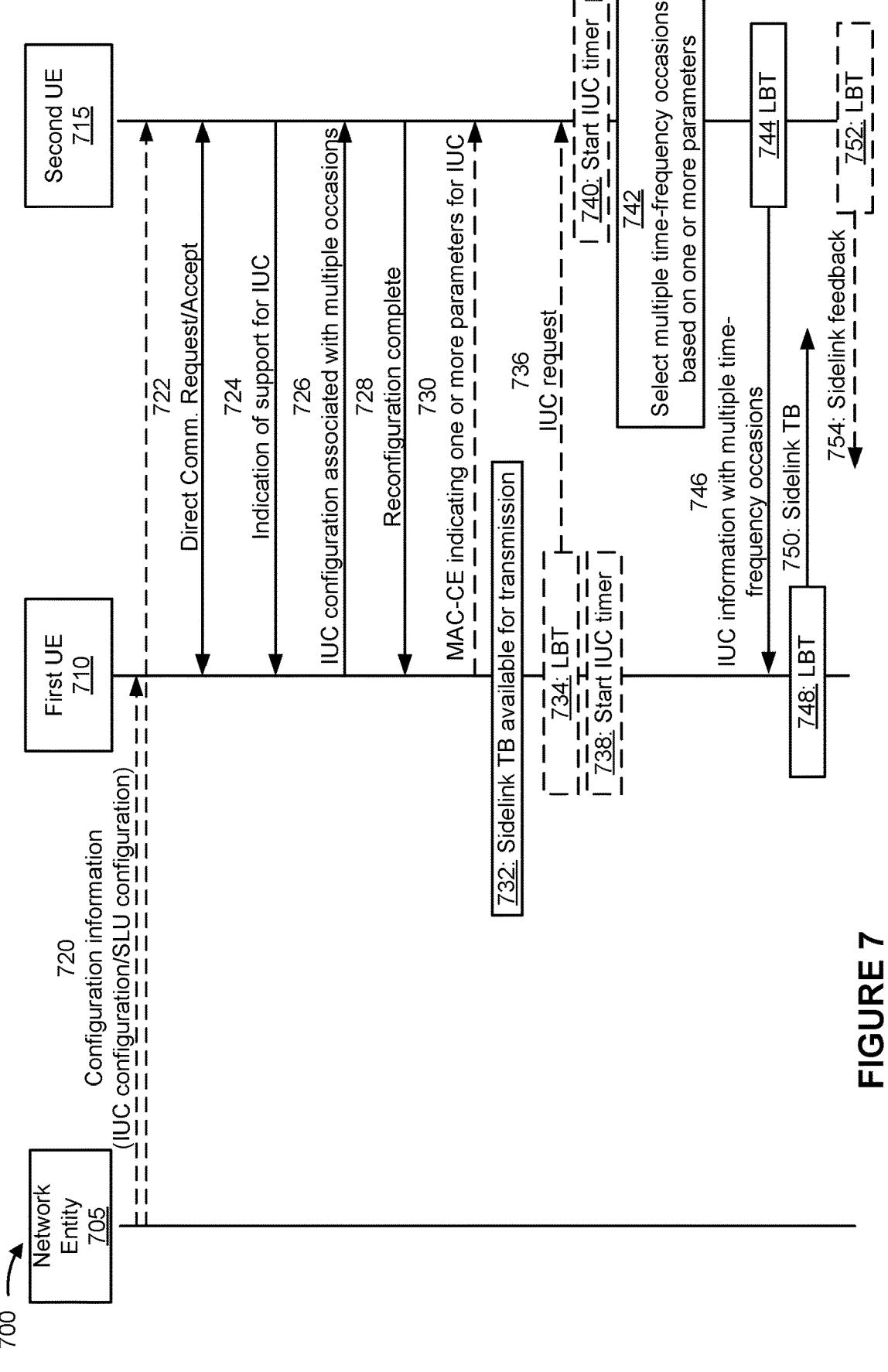
FIG. 7 is a diagram illustrating an example associated with IUC for sidelink scheduling using multiple time-frequency occasions, in accordance with the present disclosure.

FIG. 7 is a diagram illustrating an example associated with IUC 700 for sidelink scheduling using multiple time-frequency occasions, in accordance with the present disclosure. As shown in FIG. 7, a network entity 705, a first UE 710, and a second UE 715 may communicate with one another in a wireless network, such as the wireless network 100. The network entity 705 may be a base station 110, a CU, a DU, or an RU, among other examples. The first UE 710 and the second UE 715 may communicate with one another via a sidelink in a similar manner as described above in connection with FIGS. 4, 5, 6A, and 6B.

In some aspects, in a first operation 720, the network entity 705 may transmit, and the first UE 710 may receive, configuration information. Similarly, the network entity 705 may transmit, and the second UE 715 may receive, configuration information. In some aspects, the first UE 710 and the second UE 715 may receive the configuration information from different network entities.

For example, the first UE 710 and the second UE 715 may be respectively configured (for example, configured by a manufacturer or service provider or configured by the network entity 705 while under the coverage of the network entity 705) with a sidelink configuration (for example, SL-config) for sidelink communication services. The sidelink communication configuration (for example, SL-config) for the first UE 710 may indicate one or more supported sidelink carriers for the first UE 710 (for example, sidelink carrier(s) that are to be supported by the first UE 710 for different services with different QoS profiles), one or more supported sidelink BWPs on each sidelink carrier in shared or unlicensed frequency bands for the first UE 710 (for example, sidelink BWP(s) that are to be supported by the first UE 710), or one or more supported sidelink resource pools within each sidelink BWP for the first UE 710 (for example, sidelink resource pool(s) that are to be supported by the first UE 710).

Moreover, the sidelink configuration (for example, SL-config) for the first UE 710 may identify one or more IUC parameters for supporting IUC on a sidelink (for example, for Mode 2 resource allocation or scheduling on the sidelink). The one or more IUC parameters may include, for example, whether the first UE 710 supports request-based IUC (for example, as illustrated in FIG. 6A) or condition-based IUC (for example, as illustrated in FIG. 6B). The one or more IUC parameters may include, for example, whether the first UE 710 supports indicating or receiving preferred sidelink resources or non-preferred sidelink resources. The one or more IUC parameters may include, for example, whether the first UE 710 supports a latency bound for IUC operations (for example, the latency between an IUC request and an IUC response indicated in FIG. 6A). The one or more IUC parameters may include, for example, whether UE 120*a* retransmissions (or subsequent new transmissions) of IUC requests are enabled for the first UE 710. The one or more IUC parameters may include, for example, an indication of one or more sidelink resources that are dedicated for IUC request (for example, the IUC request in FIG. 6A) transmission/reception, IUC response (for example, the IUC request in FIG. 6A), or IUC indication (for example, the IUC indication in FIG. 6B) transmission/reception. The one or more IUC parameters may include, for example, an indication of one or more conditions for IUC indication as described in FIG. 6B.

In some aspects, the sidelink configuration (for example, SL-config) may include a sidelink unlicensed (SLU) configuration (for example, SLU-config) for sidelink services on a shared or unlicensed frequency band. For example, the SLU configuration (for example, SLU-config) may indicate that the first UE 710 is configured to transmit or receive sidelink communications via a shared or unlicensed frequency band or a combination of shared or unlicensed frequency bands (for example, one or more frequency band combinations of unlicensed frequency bands or shared frequency bands). In some aspects, the SLU configuration (for example, SLU-config) may indicate a channel access procedure to be performed by the first UE 710 associated with communicating via a shared or unlicensed frequency band, such as an LBT procedure, among other examples. In some aspects, the SLU configuration (for example, SLU-config) or the sidelink configuration (for example, SL-config) may indicate that IUC for sidelink scheduling (for example, for Mode 2 sidelink scheduling) is to be associated with multiple time-frequency occasions (for example, multiple transmission occasions for a single transmission) for a given sidelink communication to be transmitted via the shared or unlicensed frequency band, as explained in more detail elsewhere herein. For example, the SLU configuration (for example, SLU-config) or the sidelink configuration (for example, SL-config) may indicate that IUC information (for example, in an IUC response or an IUC indication) is to include multiple time-frequency occasions (for example, multiple transmission occasions for a single transmission) for a given sidelink communication to be transmitted via the shared or unlicensed frequency band. The SLU configuration (for example, SLU-config) may be an RRC configuration by the network entity 705 when the first UE 710 or the second UE 715 is under the coverage of the wireless network 100 or may be configured by a manufacturer (for example, in an OEM configuration) or service provider, among other examples. Similarly, the sidelink configuration (for example, SL-config) may be an RRC configuration by the network entity 705 when the first UE 710 or the second UE 715 is under the coverage of the wireless network 100 or may be configured by a manufacturer (for example, in an OEM configuration) or service provider, among other examples.

In some aspects, the multiple time-frequency occasions may be associated with one or more parameters (for example, that define or indicate how the multiple time-frequency occasions are to be selected, indicated, or scheduled). In some aspects, at least one parameter (or all parameters) of the one or more parameters may be defined, or otherwise fixed, by a wireless communication standard, such as the 3GPP. In such examples, the parameter(s) defined, or otherwise fixed, by a wireless communication standard may be configured for the first UE 710 and the second UE 715 via a manufacturer or service provider. In some aspects, at least one parameter (or all parameters) of the one or more parameters may be indicated by the network entity 705 (for example, in the sidelink configuration or the SLU configuration). Additionally or alternatively, the one or more parameters may be indicated or modified by the first UE 710 or the second UE 715, as described in more detail below.

The one or more parameters may include a quantity of the multiple time-frequency occasions for each transmission of the sidelink data communication (for example, for each of both initial transmission and retransmissions of the sidelink data communication), a quantity (for example, M) of time-frequency occasions for an initial transmission of a sidelink data communication, a quantity (for example, M') of time-frequency occasions for a retransmissions of the sidelink data communication (for example, the M' may be same as or different from the M), a time gap (for example, tx_gap) between adjacent (for example, in the time domain) time-frequency occasions of the multiple time-frequency occasions for a transmission, or a frequency offset (for example, tx_offset) between adjacent (for example, in the frequency domain) time-frequency occasions of the multiple time-frequency occasions for a single transmission, among other examples.

The one or more parameters may include a quantity of the multiple time-frequency occasions for each feedback associated to the transmissions of the sidelink data communication (for example, for each of both initial transmission and retransmissions of the sidelink data communication), a quantity (for example, N) of time-frequency occasions for a sidelink feedback communication, a time gap (for example, a feedback (fd) gap, fd_gap) between adjacent (for example, in the time domain) time-frequency occasions of the multiple time-frequency occasions for a feedback, or a frequency offset (for example, a feedback (fd) offset, fd_offset) between adjacent (for example, in the frequency domain) time-frequency occasions of the multiple time-frequency occasions for a feedback, among other examples.

The one or more parameters may be based at least in part on a QoS profile associated with a given sidelink communication or transport block (TB), an LBT procedure success or failure rate, a quantity of consecutive LBT failures, a latency requirement associated with the sidelink data communication, or a CBR or RSRP associated with the sidelink channel, among other examples. For example, the SLU configuration (for example, SLU-config) or the sidelink configuration (for example, SL-config) may indicate different values or information for the one or more parameters (for example, different values of M or M', different values of N, different values for time gap tx_gap or fd_gap, or different values for frequency offset tx_offset or fd_offset, among other examples) for different QoS profiles or QoS requirements of services, different LBT success or failure rates, different quantities of consecutive LBT failures, or different channel conditions with CBR or RSRP levels, among other examples. In other words, the one or more parameters may include respective values or information associated with one or more QoS profiles or one or more LBT measurements (for example, an LBT success rate, an LBT failure rate, a quantity of (consecutive) LBT failures, or other LBT measurements). The first UE 710 or the second UE 715 may select values or settings for the one or more parameters for an IUC procedure based at least in part on a QoS profile or QoS requirement associated with a sidelink communication to be transmitted, a current channel condition with CBR level or RSRP associated with the sidelink channel, or a current LBT success or failure rate or quantity of consecutive LBT failures associated with the sidelink channel, among other examples, as explained in more detail elsewhere herein. For example, more occasions may be configured for a QoS profile with high reliability or priority sidelink communication in the unlicensed frequency band. For example, a small gap or no gap in time between adjacent occasions may be configured associated with a QoS profile with low latency (for example, a low packet delay budget (PDB)) sidelink communication in the shared or unlicensed frequency band. As another example, fewer occasions or larger gap in time may be configured if the channel is congested (for example, if the channel is associated with a high CBR or RSRP measurements). For example, more occasions or reduced gap in time to improve LBT performance if the LBT performance is low (for example, low LBT success rate or high LBT failure rate or high quantity of consecutive LBT failures).

The second UE 715 may be configured in a similar (or the same) manner as described above in connection with the first UE 710. For example, the second UE 715 may receive or obtain a sidelink configuration (for example, SL-config) or an SLU configuration (for example, SLU-config), among other examples. Additionally, the second UE 715 may receive or obtain an indication of the one or more parameters associated with multiple time-frequency occasion-based IUC in a similar manner as described above. Additionally, the first UE 710 may perform a channel access procedure (for example, a LBT procedure) and forward the configuration (for example, SL-config or SLU-config) to the second UE 715 via sidelink RRC communication on PC5 interface (for example, using broadcast or groupcast or unicast RRC communication on PC5 interface) on a shared or unlicensed frequency bands (for example, preconfigured or indicated by the upper layer such as service or application layer).

In some aspects, in a second operation 722, the first UE 710 and the second UE 715 may perform a sidelink connection establishment procedure (for example, a PC5 RRC connection establishment procedure) to establish a sidelink connection between the first UE 710 and the second UE 715 on a shared or unlicensed frequency band (for example, using one or more resource pools within a sidelink BWP on a sidelink carrier where the resource pool(s) and the sidelink BWP and the sidelink carrier may be preconfigured or configured based on the service using sidelink communication on a shared or unlicensed frequency band or based on a common or default configuration for resource pools, sidelink BWP(s) and/or sidelink carrier(s) for sidelink communication on a shared or unlicensed frequency band, or may be indicated by the upper layer such as service or application layer). In some aspects, the sidelink connection may be established to support IUC between the first UE 710 and the second UE 715. In some aspects, the first UE 710 may initiate the sidelink connection establishment procedure to transmit a sidelink communication to the second UE 715. As part of the sidelink connection establishment procedure, the first UE 710 may perform a channel access procedure (for example, LBT) in one or more resource pools within one or more sidelink BWPs associated to one or more sidelink carriers on shared or unlicensed frequency bands which may be (pre)configured or indicated by the upper layer and transmit (and the second UE 715 may receive) a connection request communication (for example, a Direct Communication Request message). The second UE 715 may perform a channel access procedure (for example, LBT) in one or more pools within one or more sidelink BWPs associated to one or more sidelink carriers on shared or unlicensed frequency bands which may be (pre)configured or indicated by the upper layer and transmit (and the first UE 710 may receive) a connection acceptance communication (for example, a Direct Communication Accept communication) based at least in part on the connection request communication (for example, the received Direct Communication Request communication). In some aspects, the second UE 715 may respond in the same or different resource pool in the sidelink BWP on the carrier that was used by the first UE 710 in the second operation 722. The connection acceptance communication may indicate that the connection request is accepted by the second UE 715.

During the sidelink connection establishment procedure (for example, as part of the second operation 722), the first UE 710 and the second UE 715 may exchange communications (for example, exchange communications for sidelink UE capability information) to provide indications of the sidelink parameters for sidelink communications on shared or unlicensed frequency bands or the IUC parameters indicated in their respective sidelink configurations. For example, the first UE 710 may perform a channel access procedure (for example, an LBT procedure) and transmit (and the second UE 715 may receive) a UE capability enquiry sidelink communication (for example, a UECapabilityEnquirySidelink communication) that indicates the one or more supported sidelink carriers and the one or more supported sidelink BWPs associated with each sidelink carrier for the first UE 710 using shared or unlicensed frequency bands, the one or more supported sidelink resource pools in each sidelink BWP within share or unlicensed frequency bands for the first UE 710, the one or more IUC parameters for the first UE 710, or the one or more parameters associated with multiple time-frequency occasion-based IUC, among other examples. This information may be included in the UE capability enquiry sidelink communication (for example, in a ueCapabilityInformationSidelink information element (IE) of the UECapabilityEnquirySidelink communication). In a third operation 724, the second UE 715 may perform a channel access procedure (for example, an LBT procedure) and transmit (and the first UE 710 may receive) a communication (for example, responding to the received UE capability enquiry sidelink communication) including an indication of support for IUC, which indicates the one or more supported sidelink carriers and the one or more supported sidelink BWPs associated to each sidelink carrier for the second UE 715 using shared or unlicensed frequency bands, the one or more supported sidelink resource pools in each sidelink BWP within share or unlicensed frequency bands for the second UE 715, the one or more IUC parameters for the second UE 715, or the one or more parameters associated with multiple time-frequency occasion-based IUC, among other examples. The second UE 715 may transmit the UE capability information sidelink communication (for example, the UECapabilityInformation-Sidelink communication) to the first UE 710 based at least in part on receiving the UE capability enquiry sidelink communication (for example, the UECapabilityEnquiry-Sidelink communication) from the first UE 710. The information may be included in an IE (for example, the ueCapabilityInformationSidelink IE of the UECapabilityInformationSidelink communication).

In the third operation 724, the second UE 715 may perform a channel access procedure (for example, an LBT procedure) and transmit, and the first UE 710 may receive, an indication that the second UE 715 supports an IUC procedure. In some aspects, in the third operation 724, the second UE 715 may indicate that the second UE 715 supports indicating or scheduling multiple time-frequency occasions for a single sidelink communication (for example, a single sidelink data communication or a single sidelink feedback communication) via an IUC information communication as well as one or more resource pools, one or more sidelink BWPs and/or one or more sidelink carriers on shared or unlicensed frequency bands.

Additionally or alternatively, in the third operation 724, the second UE 715 may perform a channel access procedure (for example, an LBT procedure) and transmit (and the first UE 710 may receive) a UE assistance information sidelink communication (for example, a UEAssistanceInformation-Sidelink communication). The UE assistance information sidelink communication may indicate one or more preferred sidelink carriers and one or more preferred sidelink BWPs associated to each preferred sidelink carrier for the second UE 715 using shared or unlicensed frequency bands, one or more preferred sidelink resource pools in each sidelink BWP within share or unlicensed frequency bands for the second UE 715, one or more preferred IUC parameters for the second UE 715, or one or more parameters for the multiple time-frequency occasion-based IUC, among other examples. The second UE 715 may determine or select preferred sidelink carriers and the preferred sidelink BWPs associated to each preferred sidelink carrier in shared or unlicensed frequency bands, preferred sidelink resource pools in each preferred sidelink BWP on each preferred sidelink carriers on shared or unlicensed frequency bands, or preferred IUC parameters based at least in part on the supported services or QoS profiles for the first UE 710, sidelink signal measurements, sidelink resource usage and scheduling, channel conditions, or other parameters.

In some aspects, the first UE 710 or the second UE 715 may determine one or more multi-occasion parameter values (for example, a quantity of occasions for transmission or feedback, a time gap or frequency offset for the multiple transmission or feedback occasions, among other examples) based at least in part on the QoS profile (for example, reliability or priority, latency, among other examples) of the sidelink communication, a channel condition (for example, CBR or RSRP or RSRQ level), the LBT performance (for example, the LBT success or failure rate, or the quantity of consecutive LBT failures). For example, the first UE 710 or second UE 715 may determine more occasions or a smaller (or no) time gap for the sidelink communication associated with a QoS profile requiring higher reliability or shorter latency. For example, the first UE 710 or second UE 715 may determine fewer occasions or a larger time gap for the sidelink communication if the channel is congested (for example, is associated with a high CBR or RSRP measurement). As another example, the first UE 710 or the second UE 715 may determine more occasions or a smaller (or no) time gap for the sidelink communication if the LBT performance is poor (for example, is associated with low success rate or high LBT failure rate or high quantity of consecutive LBT failures).

In a fourth operation 726, the first UE 710 may determine and transmit (and the second UE 715 may receive) a sidelink RRC configuration communication (for example, an RRCReconfigurationSidelink communication via the PC5 interface). As part of the fourth operation 726, the first UE 710 may perform a channel access procedure, such as an LBT procedure, to transmit the sidelink RRC configuration communication. For example, the first UE 710 may transmit the sidelink RRC configuration communication based at least in part on the channel access procedure indicating that time-frequency resources associated with the shared or unlicensed frequency band are available for the first UE 710.

The sidelink RRC configuration communication may include an indication of one or more determined sidelink carriers that are to be used by the first UE 710 and the second UE 715 on the sidelink, one or more determined sidelink BWPs for each indicated sidelink carrier that are to be used by the first UE 710 and the second UE 715 on the sidelink, one or more determined sidelink resource pools for each indicated sidelink BWP that are to be used by the first UE 710 and the second UE 715 on the sidelink, or one or more determined IUC parameters that are to be used by the first UE 710 and the second UE 715 on the sidelink, among other examples. Additionally, the sidelink RRC configuration communication may indicate the one or more parameters associated with multiple time-frequency occasion-based IUC, such as the quantity of the multiple time-frequency occasions for transmissions of the sidelink data communication (for example, for both initial transmission and retransmissions of a sidelink data communication), the quantity (for example, M) of time-frequency occasions for an initial of a sidelink data communication, the quantity (for example, N) of time-frequency occasions for a sidelink feedback communication associated to a transmission, the quantity of time-frequency occasions for a retransmissions of the sidelink data communication (for example, which may be M or a different quantity M'), the time gap (for example, tx_gap) between adjacent (for example, in the time domain) time-frequency occasions of the multiple time-frequency occasions of a transmission, the time gap (for example, fd_gap) between adjacent (for example, in the time domain) time-frequency occasions of the multiple time-frequency occasions of a feedback, the frequency offset (for example, tx_offset) between adjacent (for example, in the frequency domain) time-frequency occasions of the multiple time-frequency occasions of a transmission, or the frequency offset (for example, fd_offset) between adjacent (for example, in the frequency domain) time-frequency occasions of the multiple time-frequency occasions of a feedback, among other examples.

The first UE 710 may determine the parameters included in the sidelink RRC configuration communication based at least in part on the preferred parameters indicated by the second UE 715 (for example, the received UEAssistanceInformationSidelink communication during the third operation 724), the supported parameters of the second UE 715 (for example, the transmitted UECapabilityEnquirySidelink communication during the third operation 724, or the received sidelink configuration SL-config in the first operation 720), or the supported parameters of the second UE 715 (for example, based at least in part on the received UECapabilityInformationSidelink message during the third operation 724 or the received sidelink configuration SL-config in the first operation 720), among other examples.

In a fifth operation 728, the second UE 715 may transmit (and the first UE 710 may receive) an RRC reconfiguration complete communication (for example, an RRCReconfigurationCompleteSidelink message). As part of the fifth operation 728, the second UE 715 may perform a channel access procedure, such as an LBT procedure, to transmit the RRC reconfiguration complete communication. For example, the second UE 715 may transmit the RRC reconfiguration complete communication based at least in part on the channel access procedure indicating that time-frequency resources associated with the shared or unlicensed frequency band are available for the second UE 715. The RRC reconfiguration complete communication may indicate that the determined parameters are accepted and configured at the second UE 715. Alternatively, the second UE 715 may transmit (and the first UE 710 may receive) an RRC reconfiguration failure or rejection communication (for example, an RRCReconifugrationFailureSidelink message or an RRCReconifugrationCompleteSidelink message with an error code or rejection cause) that indicates that the determined parameters are not accepted. Additionally, the second UE 715 may indicate preferred configuration with the RRC reconfiguration failure or rejection communication (for example, an RRCReconifugrationFailureSidelink message or an RRCReconifugrationCompleteSidelink message) or another UE assistance information sidelink communication (for example, a UEAssistanceInformationSidelink message). In such examples, the first UE 710 may select another set of determined parameters for acceptance by the second UE 715 based on the second UE 715's preference.

If the second UE 715 accepts the determined parameters, the first UE 710 and the second UE 715 may have established the sidelink connection. The first UE 710 and the second UE 715 may communicate to each other via the established sidelink connection using the resource pools in one or more sidelink BWPs on one or more sidelink carriers on shared or unlicensed frequency bands as configured via the RRC configuration on PC5 at the fourth operation 726. The second operation 722, the third operation 724, the fourth operation 726, and the fifth operation 728 may be associated with sidelink configured parameters for the multiple time-frequency occasion-based IUC. For example, the one or more parameters associated with determining or selecting multiple time-frequency occasions for a given sidelink communication on a shared or unlicensed frequency band may be configured via a sidelink configuration as described above in connection with the second operation 722, the third operation 724, the fourth operation 726, and the fifth operation 728.

Additionally or alternatively, the one or more parameters associated with determining or selecting multiple time-frequency occasions for a given sidelink communication on a shared or unlicensed frequency band may activated by the first UE 710. For example, in a sixth operation 730, the first UE 710 may perform a channel access procedure (for example, an LBT procedure) and transmit, and the second UE 715 may receive, a sidelink MAC-CE communication (for example, a PC5 MAC-CE communication) indicating the one or more parameters. The one or more parameters may be activated, by the sidelink MAC-CE communication, from a set of parameters that are pre-configured, defined by a wireless communication standard, or indicated by an RRC configuration (for example, the SL-config and/or the SLU-config by the network entity 705 in the first operation 720, or a sidelink RRC configuration communication transmitted by the first UE 710 in the fourth operation 726).

For example, the first UE 710 may determine the one or more parameters. For example, the first UE 710 may determine the one or more parameters based at least in part on an LBT success or failure rate (for example, experienced by the first UE 710), a quantity of consecutive LBT failures (for example, experienced by the first UE 710), a priority or a latency associated with a QoS profile of a service associated with the first UE 710, or channel information (for example, CBR or RSRP measured by the first UE 710), among other examples. The first UE 710 may indicate (for example, may activate) the determined one or more parameters via the sidelink MAC-CE communication. As part of the sixth operation 730, the first UE 710 may perform one or more channel access procedures (for example, one or more LBT procedures) to transmit the sidelink MAC-CE communication via the shared or unlicensed frequency band.

In some aspects, the one or more parameters associated with determining or selecting multiple time-frequency occasions for a given sidelink communication may be dynamically indicated by the first UE 710, such as in an IUC request communication. For example, in a seventh operation 732, the first UE 710 may detect or obtain one or more sidelink TBs (for example, a sidelink data communication) that is available for transmission.

In some aspects (for example, in request-based IUC examples, such as depicted in FIG. 6A), in an eighth operation 734 and a ninth operation 736, the first UE 710 may transmit, and the second UE 715 may receive, an IUC request communication. The IUC request communication may request IUC response with multiple time-frequency occasions for the sidelink communication (for example, the one or more sidelink TBs) to be transmitted by the first UE 710. In some aspects, the IUC request communication may indicate at least one of the one or more parameters associated with determining or selecting multiple time-frequency occasions for the TB(s) of a given sidelink communication. For example, the IUC request communication may indicate the quantity of the multiple time-frequency occasions for each of transmissions of the sidelink data communication (for example, for both initial transmission and retransmissions of the sidelink data communication with the TB), the quantity (for example, M) of time-frequency occasions for initial transmission of a sidelink data communication, the quantity (for example, N) of time-frequency occasions for the sidelink feedback communication, the quantity of time-frequency occasions for each of retransmissions of the sidelink data communication (for example, which may be M or a different quantity M'), the time gap (for example, tx_gap) between consecutive (for example, in the time domain) time-frequency occasions of the multiple time-frequency occasions of a transmission, the frequency offset (for example, tx_offset) between consecutive (for example, in the frequency domain) time-frequency occasions of the multiple time-frequency occasions of a transmission, the time gap (for example, tx_gap) between consecutive (for example, in the time domain) time-frequency occasions of the multiple time-frequency occasions of a feedback, or the frequency offset (for example, tx_offset) between consecutive (for example, in the frequency domain) time-frequency occasions of the multiple time-frequency occasions of a feedback, among other examples.

Additionally or alternatively, the IUC request communication may indicate information to be used by the second UE 715 to determine the one or more parameters. For example, the IUC request communication may indicate a QoS profile associated with the sidelink communication to be transmitted, a priority (for example, a QoS priority) associated with the sidelink communication, a reliability requirement associated with the sidelink communication, a latency requirement associated with the sidelink communication, a PDB (or a remaining PDB) associated with the sidelink communication, an LBT success or failure rate experienced by the first UE 710, a quantity of consecutive LBT failures experienced by the first UE 710, or a CBR or RSRP measurement associated with the sidelink channel, among other examples.

The first UE 710 may determine the one or more parameters or may determine the information to be used by the second UE 715 to determine the one or more parameters. For example, the first UE 710 may perform one or more measurements, obtain LBT information, obtain channel information, or obtain information (for example, QoS information) associated with the sidelink communication to be transmitted by the first UE 710. In the eighth operation 734, the first UE 710 may perform a channel access procedure, such as the LBT procedure for transmitting the IUC request communication. For example, the first UE 710 may transmit the IUC request communication in the ninth operation 736 based at least in part on the LBT procedure indicating that radio resource to be used to transmit the IUC request communication is available. In a tenth operation 738, the first UE 710 may start IUC timer based on a latency bound between IUC request and IUC response. In the eleventh operation 740, the second UE 715 may start IUC timer, based on a latency bound between IUC request and IUC response, after receiving the IUC request.

Figure 8:
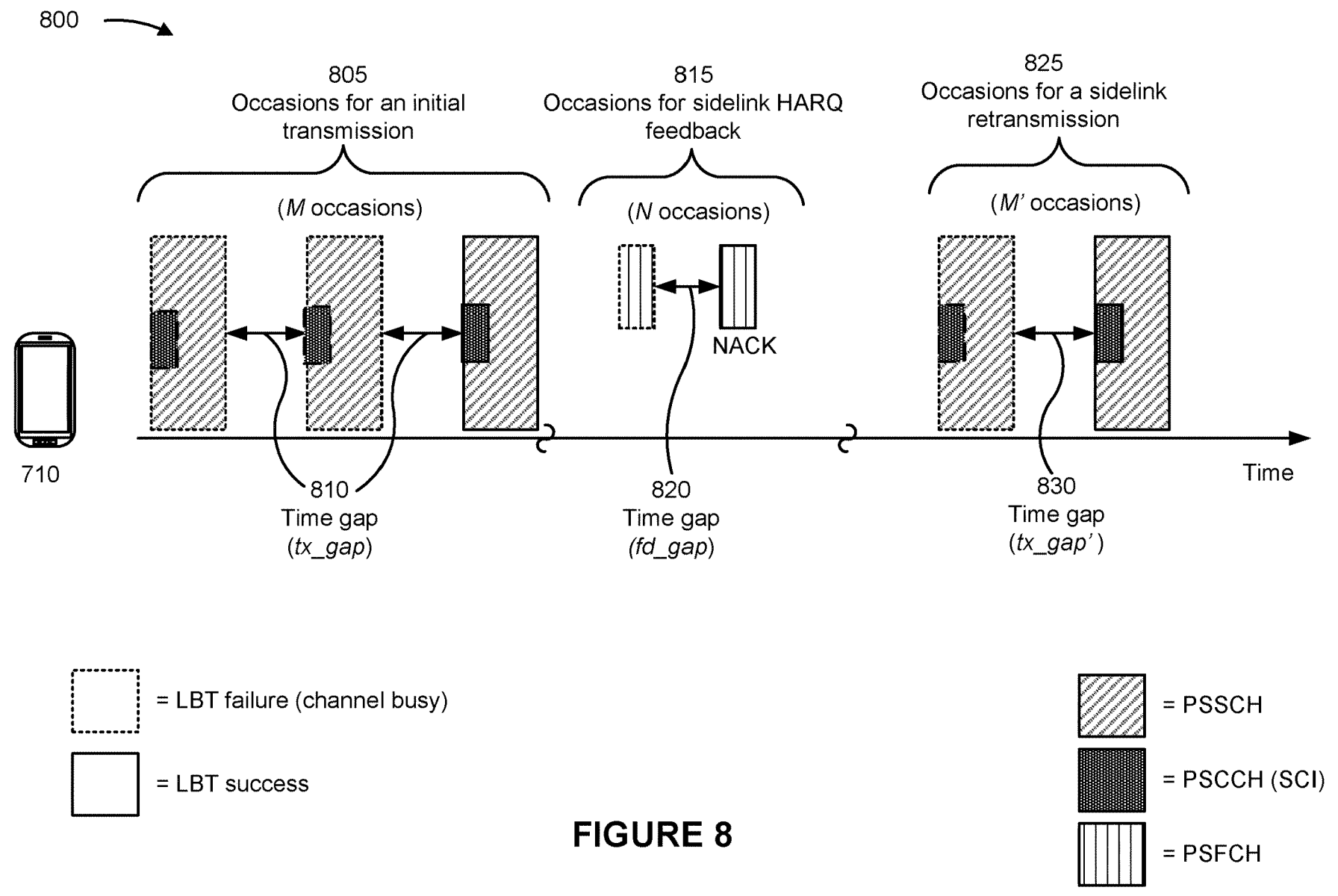
Figure 9:
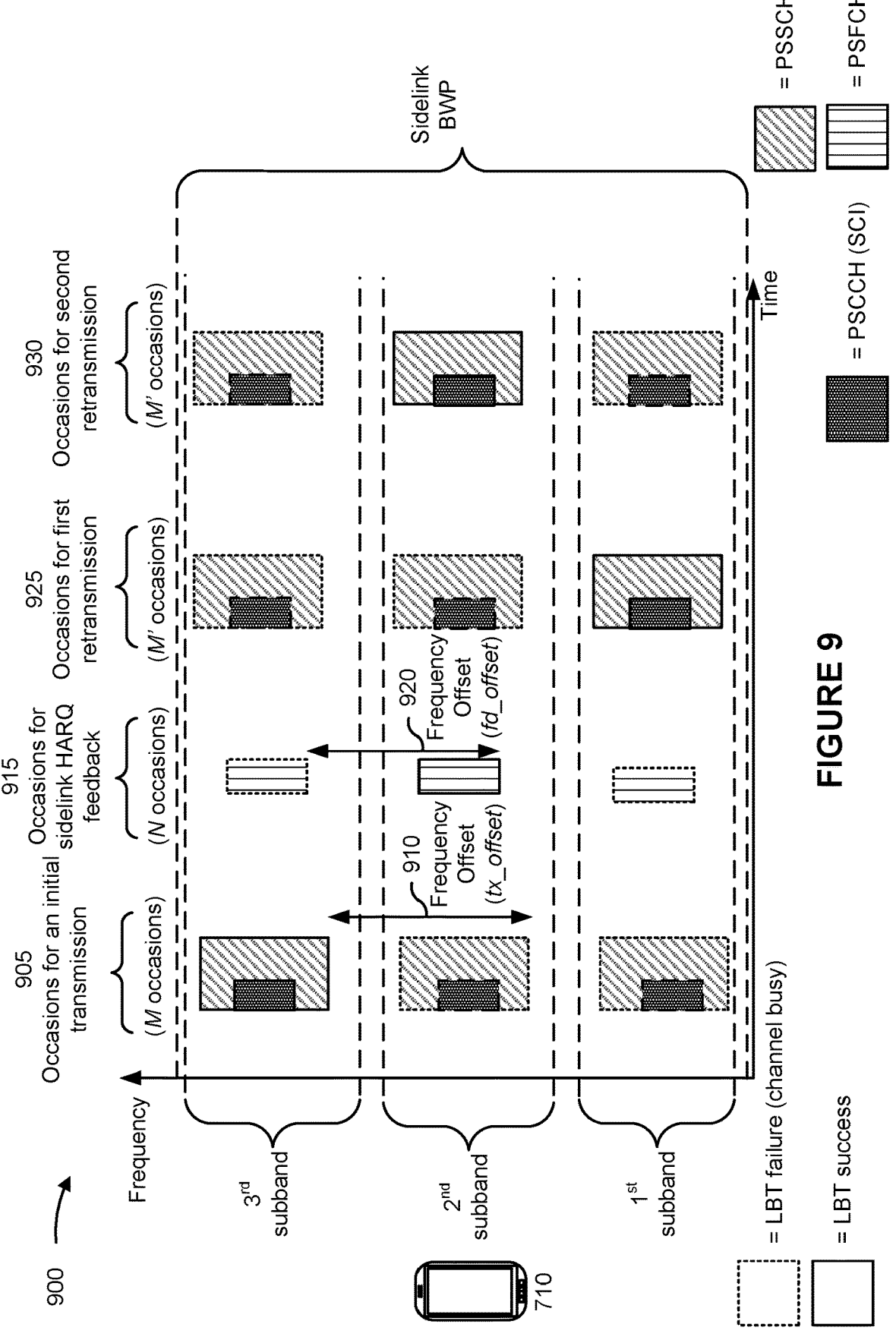
FIG. 9 is a diagram illustrating an example associated with frequency-duplexed time-frequency occasions for IUC using multiple time-frequency occasions, in accordance with the present disclosure.

In a twelfth operation 742, the second UE 715 may select or determine multiple time-frequency occasions for a given sidelink communication with one or more TBs. For example, the second UE 715 may select multiple time-frequency occasions for an initial transmission of a sidelink data communication, multiple time-frequency occasions for each retransmissions of the sidelink data communication, or multiple time-frequency occasions for each sidelink feedback communication (for example, a sidelink HARQ feedback communication) associated to the sidelink transmissions (for example, the initial transmission and retransmissions). The second UE 715 may select or determine the multiple time-frequency occasions in one or more resource pools (for example, configured or activated as described previously, or indicated by the first UE 710 in IUC request, or selected by the second UE 715 based on QoS profile, LBT information and channel information) within one or more sidelink BWP (for example, configured or activated as described previously, or indicated by the first UE 710 in IUC request, or selected by the second UE 715 based on QoS profile, LBT information and channel information) on one or more sidelink carriers (for example, configured or activated as described previously, or indicated by the first UE 710 in IUC request, or selected by the second UE 715 based on QoS profile, LBT information and channel information) on shared or unlicensed frequency bands based at least in part on the one or more parameters (for example, configured, activated, or dynamically indicated to the second UE 715 as described above), a QoS profile (with QoS parameters for data volume or data rate, reliability, priority, latency, among other examples) associated with the sidelink communication to be transmitted by the first UE 710, an LBT procedure success rate or failure rate experienced by the first UE 710 or by the second UE 715, a quantity of consecutive LBT failures experienced by the first UE 710 or by the second UE 715 (for example, over a time window), or a CBR or RSRP associated with the sidelink channel experienced by the first UE 710 or by the second UE 715, among other examples. As depicted and described in more detail in connection with FIGS. 8 and 9, the multiple time-frequency occasions may be duplexed in the time domain (for example, as depicted in FIG. 8), the frequency domain (for example, as depicted in FIG. 9), or both the time domain and the frequency domain.

In an thirteenth operation 744 and a fourteenth operation 746, the second UE 715 may transmit, and the first UE 710 may receive, an IUC communication (for example, IUC response) indicating multiple time-frequency occasions for a sidelink transmission communication or a sidelink feedback communication to be transmitted by the first UE 710. The multiple time-frequency occasions may be based at least in part on the one or more parameters or other information, as described in more detail elsewhere herein. The IUC communication may be an IUC information communication. For example, the IUC information communication may be an IUC response communication (for example, similar to the IUC response communication depicted in FIG. 6A) or an IUC indication communication (for example, similar to the IUC indication communication depicted in FIG. 6B). In the thirteenth operation 744, the second UE 715 may perform a channel access procedure, such as the LBT procedure to transmit the IUC information communication. For example, the second UE 715 may transmit the IUC information communication in the fourteenth operation 746 based at least in part on the LBT procedure indicating that radio resource to be used to transmit the IUC information communication is available (for example in the thirteenth operation 744). The second UE 715 may stop the IUC timer if still running (for example, that was initiated in the eleventh operation 740) based at least in part on transmitting the IUC information to the first UE 710. The first UE 710 may stop the IUC timer (for example, that was initiated in the tenth operation 738), if still running, after receiving the IUC information from the second UE 715. In some aspects, the second UE 715 may fail transmitting the IUC information due to LBT failure or based at least in part on the IUC timer expiring. In such examples, the first UE 710 may select resources for the sidelink communication without IUC information or may transmit another IUC request to the second UE 715 if the remaining PDB allow another IUC communication.

In a fifteenth operation 748 and a sixteenth operation 750, the first UE 710 may transmit, to the second UE 715 or another UE, the sidelink data communication using at least one time-frequency occasion of the multiple time-frequency occasions of a transmission indicated by the second UE 715 in the fourteenth operation 746. For example, in the fifteenth operation 748, the first UE 710 may measure, using the at least one of the multiple time-frequency occasions, one or more channel metrics as part of an LBT procedure. In the sixteenth operation 750, the first UE 710 may transmit, using the at least one of the multiple time-frequency occasions, the sidelink data communication based at least in part on a measurement value of the one or more channel metrics satisfying a threshold (for example, based on the LBT procedure indicating that the time-frequency occasion, from the multiple time-frequency occasions, is available). In some aspects, in a seventeenth operation 752 and an eighteenth operation 754, a receiving UE (for example, another UE or the second UE 715) may transmit to the first UE 710 a sidelink feedback communication (for example, a HARQ feedback with ACK/NACK based on the decoding of the received data) using at least one time-frequency occasion of the multiple time-frequency occasions of a feedback determined in the twelfth operation 742 by the second UE 715 (for example, based on the selected resource pool with feedback resources containing multiple time-frequency occasions). The first UE 710 may monitor all the multiple time-frequency occasions for a feedback as indicated in the fourteenth operation 746 by the second UE 715 and receive an ACK/NACK feedback at one time-frequency occasion of the multiple time-frequency occasions monitored. As described elsewhere herein, the first UE 710 may transmit the sidelink data communication or the receiving UE (for example, another UE or the second UE 715) may transmit the sidelink feedback communication via an unlicensed or shared frequency band. Therefore, the second UE 715 may indicate or schedule multiple time-frequency occasions (for example, multiple transmission occasions) for a single sidelink communication (for example, for a single sidelink data communication or a single sidelink feedback communication) as part of an IUC procedure. The first UE 710 may perform LBT procedures to determine whether a time-frequency occasion, of the multiple time-frequency occasions, is available to be used by the first UE 710 to transmit the sidelink communication. The other UE or the second UE 715 may perform LBT procedures to determine whether a time-frequency occasion, of the multiple time-frequency occasions, is available to be used to transmit the feedback communication. In this way, the first UE 710 or the other UE or the second UE 715 may be provided multiple opportunities to identify available resources on a shared or unlicensed frequency band to transmit a given sidelink communication. As described in more detail elsewhere herein, this may improve a reliability associated with the sidelink communication or reduce a latency associated with the sidelink communication, among other examples.

Additionally, the second UE 715 may be enabled to select an appropriate quantity of time-frequency occasions, based at least in part on channel conditions or previous LBT procedures, to be scheduled for, or indicated to, the first UE 710. For example, a quantity of the multiple time-frequency occasions may be balanced to increase a likelihood that the first UE 710 is enabled to transmit the sidelink communication while also refraining from allocating or scheduling additional radio resources that may not be used by the first UE 710. In other words, the one or more parameters described herein may enable the second UE 715 to select or determine the multiple time-frequency occasions to optimize a resource utilization associated with the first UE 710.

FIG. 8 is a diagram illustrating an example associated with time-duplexed time-frequency occasions 800 for IUC using multiple time-frequency occasions, in accordance with the present disclosure. FIG. 8 depicts an example of multiple time-frequency occasions indicated or scheduled by the second UE 715 for the first UE 710, as described above in connection with FIG. 7.

In some aspects, the second UE 715 (not depicted in FIG. 8) may indicate or schedule, for the first UE 710, multiple time-frequency occasions 805 for an initial transmission of a sidelink data communication (for example, via an IUC information communication). As shown in FIG. 8, the multiple time-frequency occasions 805 may be duplexed in the time domain (for example, may be time division duplexed). Consecutive time-frequency occasions, of the multiple time-frequency occasions (for example, M occasions) 805, may be separated in the time domain by a time gap (for example, tx_gap) 810. For example, the one or more parameters (for example, that are configured, activated, or dynamically indicated, as described in more detail in connection with FIG. 7) may indicate a value (for example, in terms of a quantity of slots or mini-slots, symbols, or other time duration) associated with the time gap 810. In some aspects, the value may be 0 (zero) (for example, indicating that there is no time gap or that consecutive time-frequency occasions, of the multiple time-frequency occasions 805, occur in consecutive slots or mini-slots). In some other aspects, the value may be greater than 0 (for example, indicating that consecutive time-frequency occasions, of the multiple time-frequency occasions 805, are separated by at least one slot or mini-slot in the time domain).

As shown in FIG. 8, the first UE 710 (for example, as part of the tenth operation 765) may attempt to transmit a sidelink data communication using the multiple time-frequency occasions 805. As shown, the first UE 710 may determine that radio resources associated with a first time-frequency occasion and a second time-frequency occasion, of the multiple time-frequency occasions 805, are unavailable based at least in part on performing an LBT procedure. The first UE 710 may determine that radio resources associated with a third time-frequency occasion, of the multiple time-frequency occasions 805, are available based at least in part on performing an LBT procedure. Therefore, as part of the sixteenth operation 750, the first UE 710 may transmit the sidelink data communication using the third time-frequency occasion of the multiple time-frequency occasions 805.

As another example, the second UE 715 may indicate or schedule, for the first UE 710, multiple time-frequency occasions 815 for a sidelink HARQ feedback communication. As shown in FIG. 8, the multiple time-frequency occasions 815 may be duplexed in the time domain (for example, may be time division duplexed). Consecutive time-frequency occasions, of the multiple time-frequency occasions (for example, N occasions) 815, may be separated in the time domain by a time gap (for example, fd_gap) 820. For example, the one or more parameters (for example, that are configured, activated, or dynamically indicated, as described in more detail in connection with FIG. 7) may indicate a value (for example, in terms of a quantity of slots, symbols, or other time duration) associated with the time gap 820. As described above, the time gap 820 may be associated with a value of 0 (for example, 0 symbol or slot or mini-slot) or a value greater than 0. In some aspects, a value associated with the time gap (for example, fd_gap) 820 may be related to a value associated with the time gap (for example, tx_gap) 810. In some aspects, a value associated with the time gap 820 may be related to a resource pool's feedback resource allocation. In some aspects, a quantity of the multiple time-frequency occasions (for example, N) 815 may be the same as a quantity of the multiple time-frequency occasions (for example, M) 805. Alternatively, a quantity of the multiple time-frequency occasions (for example, N) 815 may be different than (for example, less than) a quantity of the multiple time-frequency occasions (for example, M) 805.

As shown in FIG. 8, the other UE or the second UE 715 (for example, as part of the seventeenth operation 752) may attempt to transmit a sidelink feedback communication using the multiple time-frequency occasions 815. As shown, the other UE or the second UE 715 may determine that radio resources associated with a first time-frequency occasion of the multiple time-frequency occasions 815 are unavailable based at least in part on performing an LBT procedure. The other UE or the second UE 715 may determine that radio resources associated with a second time-frequency occasion, of the multiple time-frequency occasions 815, are available based at least in part on performing an LBT procedure. Therefore, as part of the eighteenth operation 754, the other UE or the second UE 715 may transmit the sidelink feedback communication using the second time-frequency occasion of the multiple time-frequency occasions 815.

As another example, the second UE 715 may indicate or schedule, for the first UE 710, multiple time-frequency occasions 825 for a retransmission of the sidelink data communication. As shown in FIG. 8, the multiple time-frequency occasions 825 may be duplexed in the time domain (for example, may be time division duplexed). Consecutive time-frequency occasions, of the multiple time-frequency occasions (for example, M' occasions) 825, may be separated in the time domain by a time gap (for example, tx_gap') 830. For example, the one or more parameters (for example, that are configured, activated, or dynamically indicated, as described in more detail in connection with FIG. 7) may indicate a value (for example, in terms of a quantity of slots or mini-slots or other time duration) associated with the time gap 830. As described above, the time gap 830 may be associated with a value of 0 (zero) (for example, 0 slot or mini-slot) or a value greater than 0 (zero). In some aspects, a value associated with the time gap (for example, tx_gap') 830 may be the same as a value associated with the time gap (for example, tx_gap) 810. Alternatively, a value associated with the time gap 820 may be different than a value associated with the time gap 810 or the time gap 820. In some aspects, a quantity of the multiple time-frequency occasions (for example, M') 825 may be the same as a quantity of the multiple time-frequency occasions (for example, M) 805 (for example, a single value M may be configured or indicated to indicate the quantity of the multiple time-frequency occasions 825 and the multiple time-frequency occasions 805, thereby reducing a signaling overhead). Alternatively, a quantity of the multiple time-frequency occasions 825 may be different than a quantity of the multiple time-frequency occasions 805.

As shown in FIG. 8, the first UE 710 may attempt to transmit a retransmission of the sidelink data communication using the multiple time-frequency occasions 825 (for example, based at least in part on receiving NACK feedback associated with the sidelink data communication). As shown, the first UE 710 may determine that radio resources associated with a first time-frequency occasion of the multiple time-frequency occasions 825 are unavailable based at least in part on performing an LBT procedure. The first UE 710 may determine that radio resources associated with a second time-frequency occasion, of the multiple time-frequency occasions 825, are available based at least in part on performing an LBT procedure. Therefore, the first UE 710 may transmit the retransmission of the sidelink data communication using the second time-frequency occasion of the multiple time-frequency occasions 825.

The multiple time-frequency occasions may increase a reliability or reduce a latency associated with sidelink communications scheduled via an IUC procedure associated with a shared or unlicensed frequency band. For example, if a single time-frequency occasion were selected, scheduled, or indicated for the sidelink data communication and the first UE 710 were to experience an LBT failure associated with the single time-frequency occasion, then the first UE 710 would be required to wait until a time-frequency occasion associated with a retransmission of the sidelink data communication to transmit the sidelink data communication. Using the multiple time-frequency occasions 805, a likelihood that the first UE 710 is enabled to transmit the sidelink data communication earlier in time may be increased. As a result, a likelihood that the first UE 710 is enabled to transmit the sidelink data communication prior to an expiration of a PDB associated with the sidelink data communication may be increased. This may increase a reliability associated with the sidelink data communication (for example, because the sidelink data communication may not be dropped due to an expiration of the PDB) or reduce a latency associated with the sidelink data communication.

FIG. 9 is a diagram illustrating an example associated with frequency-duplexed time-frequency occasions 900 for IUC using multiple time-frequency occasions, in accordance with the present disclosure. For example, FIG. 9 may depict an example of multiple time-frequency occasions indicated or scheduled by the second UE 715 for the first UE 710, as described above in connection with FIG. 7.

As shown in FIG. 9, a sidelink BWP associated with the first UE 710 (and the second UE 715) may include a first subband, a second subband, and a third subband, where the subband may be an LBT subband which is a bandwidth used for LBT procedure (for example, 20 megahertz (MHz) for LBT detection). The multiple time-frequency occasions indicated, or scheduled, for a given sidelink communication may be separated in different subbands of the sidelink BWP. For example, the second UE 715 (not depicted in FIG. 9) may indicate or schedule, for the first UE 710, multiple time-frequency occasions 905 for an initial transmission of a sidelink data communication (for example, via an IUC information communication). As shown in FIG. 9, the multiple time-frequency occasions 905 may be duplexed in the frequency domain (for example, may be frequency division duplexed). Consecutive time-frequency occasions, of the multiple time-frequency occasions (for example, M occasions) 905, may be separated in the frequency domain by a frequency offset 910. For example, the one or more parameters (for example, that are configured, activated, or dynamically indicated, as described in more detail in connection with FIG. 7) may indicate a value (for example, in terms of a quantity of resource blocks or resource elements, or other frequency domain unit) associated with the frequency offset (for example, tx_offset between the starting points in frequency of adjacent occasions) 910.

As shown in FIG. 9, the first UE 710 (for example, as part of the fifteenth operation 748 or the sixteenth operation 750) may attempt to transmit a sidelink data communication using the multiple time-frequency occasions 905. As shown, the first UE 710 may determine that radio resources associated with a first time-frequency occasion and a second time-frequency occasion (for example, associated with the first subband and the second subband), of the multiple time-frequency occasions 905, are unavailable based at least in part on performing an LBT procedure in each subband at the same (or at least partially overlapping) time. The first UE 710 may determine that radio resources associated with a third time-frequency occasion (for example, associated with the third subband), of the multiple time-frequency occasions 905, are available based at least in part on performing an LBT procedure. Therefore, as part of the fifteenth operation 748 or the sixteenth operation 750, the first UE 710 may transmit the sidelink data communication using the third time-frequency occasion of the multiple time-frequency occasions 905.

As another example, the second UE 715 may indicate or schedule, for the first UE 710, multiple time-frequency occasions 915 for a sidelink HARQ feedback communication. As shown in FIG. 9, the multiple time-frequency occasions 915 may be duplexed in the frequency domain (for example, may be frequency division duplexed). Consecutive time-frequency occasions, of the multiple time-frequency occasions (for example, N occasions) 915, may be separated in the time domain by a frequency offset 920. For example, the one or more parameters (for example, that are configured, activated, or dynamically indicated, as described in more detail in connection with FIG. 7) may indicate a value (for example, in terms of a quantity of resource blocks or resource elements, or other frequency domain unit) associated with the frequency offset (for example, fd_offset between the starting points in frequency of adjacent occasions) 920. In some aspects, a value associated with the frequency offset (for example, fd_offset) 920 may be the same as a value associated with the frequency offset (for example, tx_offset) 910. Alternatively, a value associated with the frequency offset (for example, fd_offset) 920 may be different than a value associated with the frequency offset (for example, tx_offset) 910. In some aspects, a quantity of the multiple time-frequency occasions (for example, N) 915 may be the same as a quantity of the multiple time-frequency occasions (for example, M) 905. Alternatively, a quantity of the multiple time-frequency occasions (for example, N) 915 may be different than (for example, less than) a quantity of the multiple time-frequency occasions (for example, M) 905.

As shown in FIG. 9, the other UE or the second UE 715 (for example, as part of the seventeenth operation 752 or the eighteenth operation 754) may attempt to transmit a sidelink feedback communication using the multiple time-frequency occasions 915. As shown, the other UE or the second UE 715 may determine that radio resources associated with a time-frequency occasion associated with the first subband and the third subband of the multiple time-frequency occasions 915 are unavailable and radio resources associated with a time-frequency occasion (for example, associated with the second subband), of the multiple time-frequency occasions 915, are available based at least in part on performing an LBT procedure in each subband at the same time. Therefore, as part of the seventeenth operation 752 or the eighteenth operation 754, the other UE or the second UE 715 may transmit the sidelink feedback communication using the time-frequency occasion of the multiple time-frequency occasions 915.

As another example, the second UE 715 may indicate or schedule, for the first UE 710, multiple time-frequency occasions 925 and multiple time-frequency occasions 930 for a first and second retransmission of the sidelink data communication. As shown in FIG. 9, the multiple time-frequency occasions 925 and the multiple time-frequency occasions 925 may be configured, scheduled, or indicated in a similar manner as described above in connection with the multiple time-frequency occasions 905.

The multiple time-frequency occasions may increase a reliability or reduce a latency associated with sidelink communications scheduled via an IUC procedure associated with a shared or unlicensed frequency band. For example, if a single time-frequency occasion were selected, scheduled, or indicated for the sidelink data communication and the first UE 710 were to experience an LBT failure associated with the single time-frequency occasion, then the first UE 710 would be required to wait until a time-frequency occasion associated with a retransmission of the sidelink data communication to transmit the sidelink data communication. Using the multiple time-frequency occasions 905, a likelihood that the first UE 710 is enabled to transmit the sidelink data communication earlier in time may be increased. As a result, a likelihood that the first UE 710 is enabled to transmit the sidelink data communication prior to an expiration of a PDB associated with the sidelink data communication may be increased. This may increase a reliability associated with the sidelink data communication (for example, because the sidelink data communication may not be dropped due to an expiration of the PDB) or reduce a latency associated with the sidelink data communication.

Although FIGS. 8 and 9 show the multiple time-frequency occasions as being time division duplexed and frequency division duplexed in separate examples, in some cases, the multiple time-frequency occasions may be duplexed in both the time domain (for example, as depicted and described in connection with FIGS. 7 and 8) and the frequency domain (for example, as depicted and described in connection with FIGS. 7 and 9). In other words, the techniques and operations described in connection with FIGS. 8 and 9 may be combined and used for the same group of multiple time-frequency occasions that are scheduled or indicated for a given sidelink communication (for example, via an IUC procedure, as described in more detail elsewhere herein).

FIG. 10 is a flowchart illustrating an example process 1000 performed, for example, by a first UE, associated with IUC for sidelink scheduling using multiple time-frequency occasions, in accordance with the present disclosure. Example process 1000 is an example where the first UE (for example, the UE 120 or the first UE 710) performs operations associated with IUC for sidelink scheduling using multiple time-frequency occasions.

As shown in FIG. 10, in some aspects, process 1000 may include receiving, from a second UE, an IUC communication indicating multiple time-frequency occasions for at least one of a sidelink data communication or a sidelink feedback communication, the multiple time-frequency occasions being based at least in part on one or more parameters (block 1010). For example, the first UE (such as by using communication manager 140 or reception component 1202, depicted in FIG. 12) may receive, from a second UE, an IUC communication indicating multiple time-frequency occasions for at least one of a sidelink data communication or a sidelink feedback communication, the multiple time-frequency occasions being based at least in part on one or more parameters, as described above.

As further shown in FIG. 10, in some aspects, process 1000 may include transmitting, to the second UE or another UE, the sidelink data communication or the sidelink feedback communication using at least one time-frequency occasion of the multiple time-frequency occasions (block 1020). For example, the first UE (such as by using communication manager 140 or transmission component 1204, depicted in FIG. 12) may transmit, to the second UE or another UE, the sidelink data communication or the sidelink feedback communication using at least one time-frequency occasion of the multiple time-frequency occasions, as described above.

Process 1000 may include additional aspects, such as any single aspect or any combination of aspects described below or in connection with one or more other processes described elsewhere herein.

In a first additional aspect, process 1000 includes transmitting, to the second UE, an IUC request communication requesting IUC information with multiple time-frequency occasions.

In a second additional aspect, alone or in combination with the first aspect, the IUC request communication indicates at least one of the one or more parameters.

In a third additional aspect, alone or in combination with one or more of the first and second aspects, the multiple time-frequency occasions include at least a first time-frequency occasion and a second time-frequency occasion, and the first time-frequency occasion and the second time-frequency occasion are duplexed in at least one of a time domain or a frequency domain.

In a fourth additional aspect, alone or in combination with one or more of the first through third aspects, the first time-frequency occasion and the second time-frequency occasion are consecutive time-frequency occasions in the time domain, and the first time-frequency occasion and the second time-frequency occasion are separated in the time domain by a time gap.

In a fifth additional aspect, alone or in combination with one or more of the first through fourth aspects, the first time-frequency occasion and the second time-frequency occasion are consecutive time-frequency occasions in the frequency domain, and the first time-frequency occasion and the second time-frequency occasion are separated in the frequency domain by a frequency offset.

In a sixth additional aspect, alone or in combination with one or more of the first through fifth aspects, the multiple time-frequency occasions include first multiple time-frequency occasions for an initial transmission of the sidelink data communication or second multiple time-frequency occasions for a sidelink feedback communication.

In a seventh additional aspect, alone or in combination with one or more of the first through sixth aspects, the multiple time-frequency occasions include third multiple time-frequency occasions for a retransmission of the sidelink data communication.

In an eighth additional aspect, alone or in combination with one or more of the first through seventh aspects, the first multiple time-frequency occasions and the third multiple time-frequency occasions include a same quantity of time-frequency occasions.

In a ninth additional aspect, alone or in combination with one or more of the first through eighth aspects, the first multiple time-frequency occasions and the third multiple time-frequency occasions include different quantities of time-frequency occasions.

In a tenth additional aspect, alone or in combination with one or more of the first through ninth aspects, the IUC communication is an IUC information communication.

In an eleventh additional aspect, alone or in combination with one or more of the first through tenth aspects, the one or more parameters are based at least in part on at least one of a QoS profile associated with the sidelink data communication, an LBT procedure success rate, a quantity of consecutive LBT failures, a latency requirement associated with the sidelink data communication, or a CBR.

In a twelfth additional aspect, alone or in combination with one or more of the first through eleventh aspects, the one or more parameters are pre-configured or defined by a wireless communication standard.

In a thirteenth additional aspect, alone or in combination with one or more of the first through twelfth aspects, process 1000 includes transmitting, to the second UE, a sidelink RRC communication indicating the one or more parameters.

In a fourteenth additional aspect, alone or in combination with one or more of the first through thirteenth aspects, process 1000 includes transmitting, to the second UE, a sidelink MAC-CE communication indicating the one or more parameters.

In a fifteenth additional aspect, alone or in combination with one or more of the first through fourteenth aspects, the one or more parameters are activated, by the sidelink MAC-CE communication, from a set of parameters that are pre-configured, defined by a wireless communication standard, or indicated by an RRC configuration.

In a sixteenth additional aspect, alone or in combination with one or more of the first through fifteenth aspects, the one or more parameters include at least one of a first quantity of the multiple time-frequency occasions for transmissions of the sidelink data communication, a second quantity of time-frequency occasions for initial transmissions of the sidelink data communication, a third quantity of time-frequency occasions for the sidelink feedback communication, a fourth quantity of time-frequency occasions for retransmissions of the sidelink data communication, a time gap between consecutive time-frequency occasions of the multiple time-frequency occasions, or a frequency offset between consecutive time-frequency occasions of the multiple time-frequency occasions.

In a seventeenth additional aspect, alone or in combination with one or more of the first through sixteenth aspects, the one or more parameters include respective values or information associated with one or more QoS profiles or one or more LBT measurements.

In an eighteenth additional aspect, alone or in combination with one or more of the first through seventeenth aspects, transmitting the sidelink data communication or the sidelink feedback communication includes measuring, using the at least one of the multiple time-frequency occasions, one or more channel metrics as part of a LBT procedure, and transmitting, using the at least one of the multiple time-frequency occasions, the sidelink data communication or the sidelink feedback communication based at least in part on a measurement value of the one or more channel metrics satisfying a threshold.

In a nineteenth additional aspect, alone or in combination with one or more of the first through eighteenth aspects, transmitting the sidelink data communication or the sidelink feedback communication includes transmitting the sidelink data communication or the sidelink feedback communication via an unlicensed or shared frequency band.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

FIG. 11 is a flowchart illustrating an example process 1100 performed, for example, by a UE, associated with IUC for sidelink scheduling using multiple time-frequency occasions, in accordance with the present disclosure. Example process 1100 is an example where the first UE (for example, a UE 120 or the second UE 715) performs operations associated with ICU for sidelink scheduling using multiple time-frequency occasions.

As shown in FIG. 11, in some aspects, process 1100 may include receiving an indication of one or more parameters associated with IUC (block 1110). For example, the first UE (such as by using communication manager 140 or reception component 1302, depicted in FIG. 13) may receive an indication of one or more parameters associated with IUC, as described above.

As further shown in FIG. 11, in some aspects, process 1100 may include transmitting, to a second UE, an IUC communication indicating multiple time-frequency occasions available to the second UE for at least one of a sidelink data communication or a sidelink feedback communication, the multiple time-frequency occasions being based at least in part on the one or more parameters (block 1120). For example, the first UE (such as by using communication manager 140 or transmission component 1304, depicted in FIG. 13) may transmit, to a second UE, an IUC communication indicating multiple time-frequency occasions available to the second UE for at least one of a sidelink data communication or a sidelink feedback communication, the multiple time-frequency occasions being based at least in part on the one or more parameters, as described above.

Process 1100 may include additional aspects, such as any single aspect or any combination of aspects described below or in connection with one or more other processes described elsewhere herein.

In a first additional aspect, process 1100 includes receiving, from the second UE, the sidelink data communication or the sidelink feedback communication using at least one time-frequency occasion of the multiple time-frequency occasions.

In a second additional aspect, alone or in combination with the first aspect, process 1100 includes receiving, from the second UE, an IUC request communication requesting IUC information with multiple time-frequency occasions.

In a third additional aspect, alone or in combination with one or more of the first and second aspects, the indication of the one of the one or more parameters is included in the IUC request communication.

In a fourth additional aspect, alone or in combination with one or more of the first through third aspects, the multiple time-frequency occasions include at least a first time-frequency occasion and a second time-frequency occasion, and the first time-frequency occasion and the second time-frequency occasion are duplexed in at least one of a time domain or a frequency domain.

In a fifth additional aspect, alone or in combination with one or more of the first through fourth aspects, the first time-frequency occasion and the second time-frequency occasion are consecutive time-frequency occasions in the time domain, and the first time-frequency occasion and the second time-frequency occasion are separated in the time domain by a time gap.

In a sixth additional aspect, alone or in combination with one or more of the first through fifth aspects, the first time-frequency occasion and the second time-frequency occasion are consecutive time-frequency occasions in the frequency domain, and the first time-frequency occasion and the second time-frequency occasion are separated in the frequency domain by a frequency offset.

In a seventh additional aspect, alone or in combination with one or more of the first through sixth aspects, the multiple time-frequency occasions include first multiple time-frequency occasions for an initial transmission of the sidelink data communication and second multiple time-frequency occasions for a sidelink feedback communication.

In an eighth additional aspect, alone or in combination with one or more of the first through seventh aspects, the multiple time-frequency occasions include third multiple time-frequency occasions for a retransmission of the sidelink data communication.

In a ninth additional aspect, alone or in combination with one or more of the first through eighth aspects, the first multiple time-frequency occasions and the third multiple time-frequency occasions include a same quantity of time-frequency occasions.

In a tenth additional aspect, alone or in combination with one or more of the first through ninth aspects, the first multiple time-frequency occasions and the third multiple time-frequency occasions include different quantities of time-frequency occasions.

In an eleventh additional aspect, alone or in combination with one or more of the first through tenth aspects, the IUC communication is an IUC information communication.

In a twelfth additional aspect, alone or in combination with one or more of the first through eleventh aspects, process 1100 includes selecting the multiple time-frequency occasions based at least in part on at least one of the one or more parameters, a QoS profile associated with the sidelink data communication, an LBT procedure success rate, a quantity of consecutive LBT failures, a latency requirement associated with the sidelink data communication, or a CBR.

In a thirteenth additional aspect, alone or in combination with one or more of the first through twelfth aspects, the one or more parameters are based at least in part on at least one of a QoS profile associated with the sidelink data communication, an LBT procedure success rate, a quantity of consecutive LBT failures, a latency requirement associated with the sidelink data communication, or a CBR.

In a fourteenth additional aspect, alone or in combination with one or more of the first through thirteenth aspects, the one or more parameters are pre-configured or defined by a wireless communication standard.

In a fifteenth additional aspect, alone or in combination with one or more of the first through fourteenth aspects, receiving the indication of the one or more parameters includes receiving, from a network entity, the indication of the one or more parameters.

In a sixteenth additional aspect, alone or in combination with one or more of the first through fifteenth aspects, receiving the indication of the one or more parameters includes receiving, from the second UE, a sidelink RRC communication indicating the one or more parameters.

In a seventeenth additional aspect, alone or in combination with one or more of the first through sixteenth aspects, receiving the indication of the one or more parameters includes receiving, from the second UE, a sidelink MAC-CE communication indicating the one or more parameters.

In an eighteenth additional aspect, alone or in combination with one or more of the first through seventeenth aspects, the one or more parameters are activated, by the sidelink MAC-CE communication, from a set of parameters that are pre-configured, defined by a wireless communication standard, or indicated by an RRC configuration.

In a nineteenth additional aspect, alone or in combination with one or more of the first through eighteenth aspects, the one or more parameters include at least one of a first quantity of the multiple time-frequency occasions for transmissions of the sidelink data communication, a second quantity of time-frequency occasions for initial transmissions of the sidelink data communication, a third quantity of time-frequency occasions for the sidelink feedback communication, a fourth quantity of time-frequency occasions for retransmissions of the sidelink data communication, a time gap between consecutive time-frequency occasions of the multiple time-frequency occasions, or a frequency offset between consecutive time-frequency occasions of the multiple time-frequency occasions.

In a twentieth additional aspect, alone or in combination with one or more of the first through nineteenth aspects, the one or more parameters include respective values or information associated with one or more QoS profiles or one or more LBT measurements.

In a twenty-first additional aspect, alone or in combination with one or more of the first through twentieth aspects, the multiple time-frequency occasions are associated with an unlicensed or shared frequency band.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
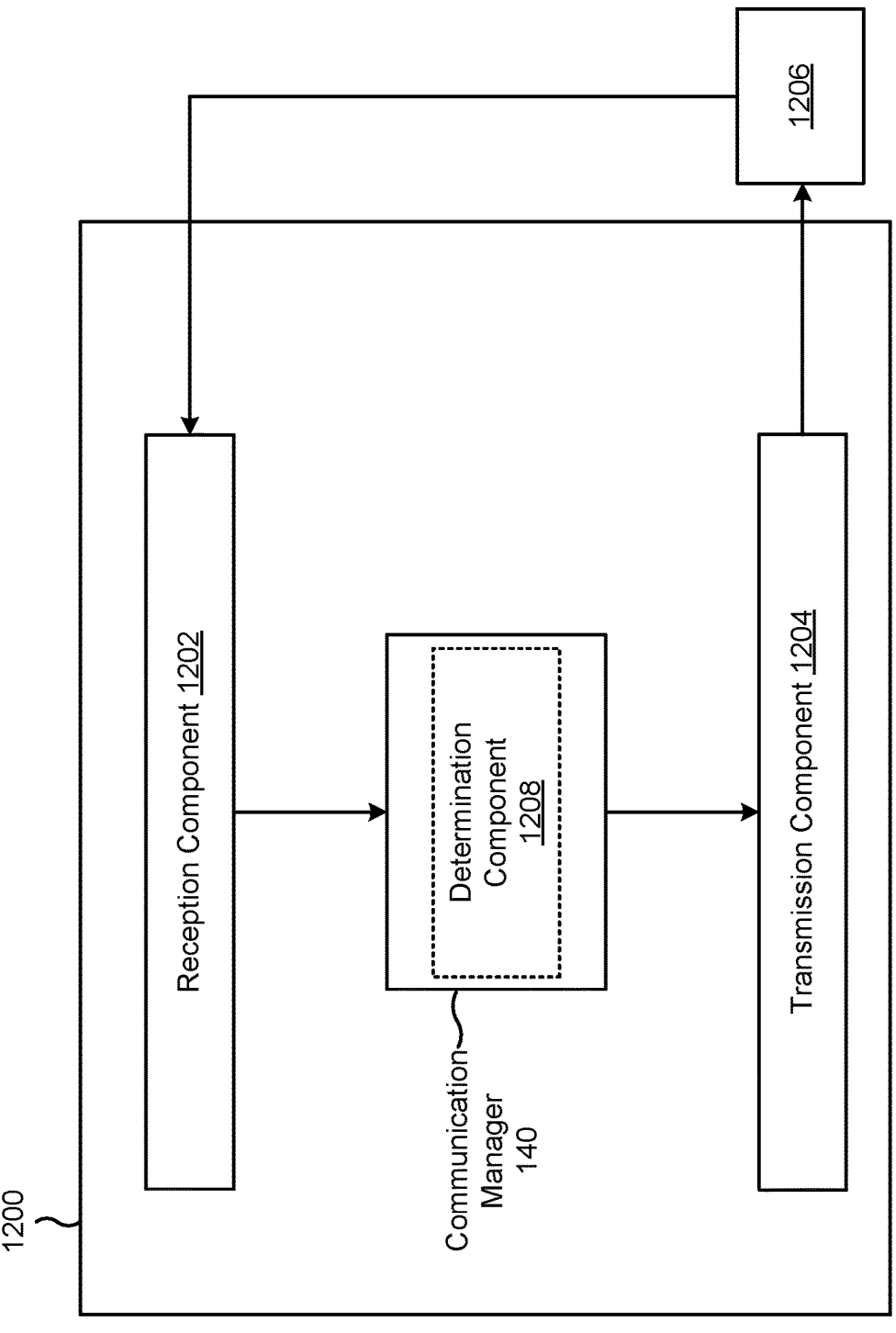
FIG. 12 is a diagram of an example apparatus for wireless communication in accordance with the present disclosure.

FIG. 12 is a diagram of an example apparatus 1200 for wireless communication in accordance with the present disclosure. The apparatus 1200 may be a UE (which may be referred to in connection with FIG. 12 as a first UE), or a UE may include the apparatus 1200. In some aspects, the apparatus 1200 includes a reception component 1202, a transmission component 1204, and a communication manager 140, which may be in communication with one another (for example, via one or more buses). As shown, the apparatus 1200 may communicate with another apparatus 1206 (such as a UE, a base station, or another wireless communication device) using the reception component 1202 and the transmission component 1204.

In some aspects, the apparatus 1200 may be configured to perform one or more operations described herein in connection with FIGS. 7-9. Additionally or alternatively, the apparatus 1200 may be configured to perform one or more processes described herein, such as process 1000 of FIG. 10, or a combination thereof. In some aspects, the apparatus 1200 may include one or more components of the UE described above in connection with FIG. 2.

The reception component 1202 may receive communications, such as reference signals, control information, data communications, or a combination thereof, from the apparatus 1206. The reception component 1202 may provide received communications to one or more other components of the apparatus 1200, such as the communication manager 140. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a modem, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, the communication manager 140 may generate communications and may transmit the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The communication manager 140 may receive or may cause the reception component 1202 to receive, from a second UE, an IUC communication indicating multiple time-frequency occasions for at least one of a sidelink data communication or a sidelink feedback communication, the multiple time-frequency occasions being based at least in part on one or more parameters. The communication manager 140 may transmit or may cause the transmission component 1204 to transmit, to the second UE or another UE, the sidelink data communication or the sidelink feedback communication using at least one time-frequency occasion of the multiple time-frequency occasions. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a determination component 1208, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive, from a second UE, an IUC communication indicating multiple time-frequency occasions for at least one of a sidelink data communication or a sidelink feedback communication, the multiple time-frequency occasions being based at least in part on one or more parameters. The transmission component 1204 may transmit, to the second UE or another UE, the sidelink data communication or the sidelink feedback communication using at least one time-frequency occasion of the multiple time-frequency occasions.

The determination component 1208 may determine the one or more parameters.

The transmission component 1204 may transmit, to the second UE, an IUC request communication requesting IUC information with multiple time-frequency occasions.

The transmission component 1204 may transmit, to the second UE, a sidelink RRC communication indicating the one or more parameters.

The transmission component 1204 may transmit, to the second UE, a sidelink MAC-CE communication indicating the one or more parameters.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
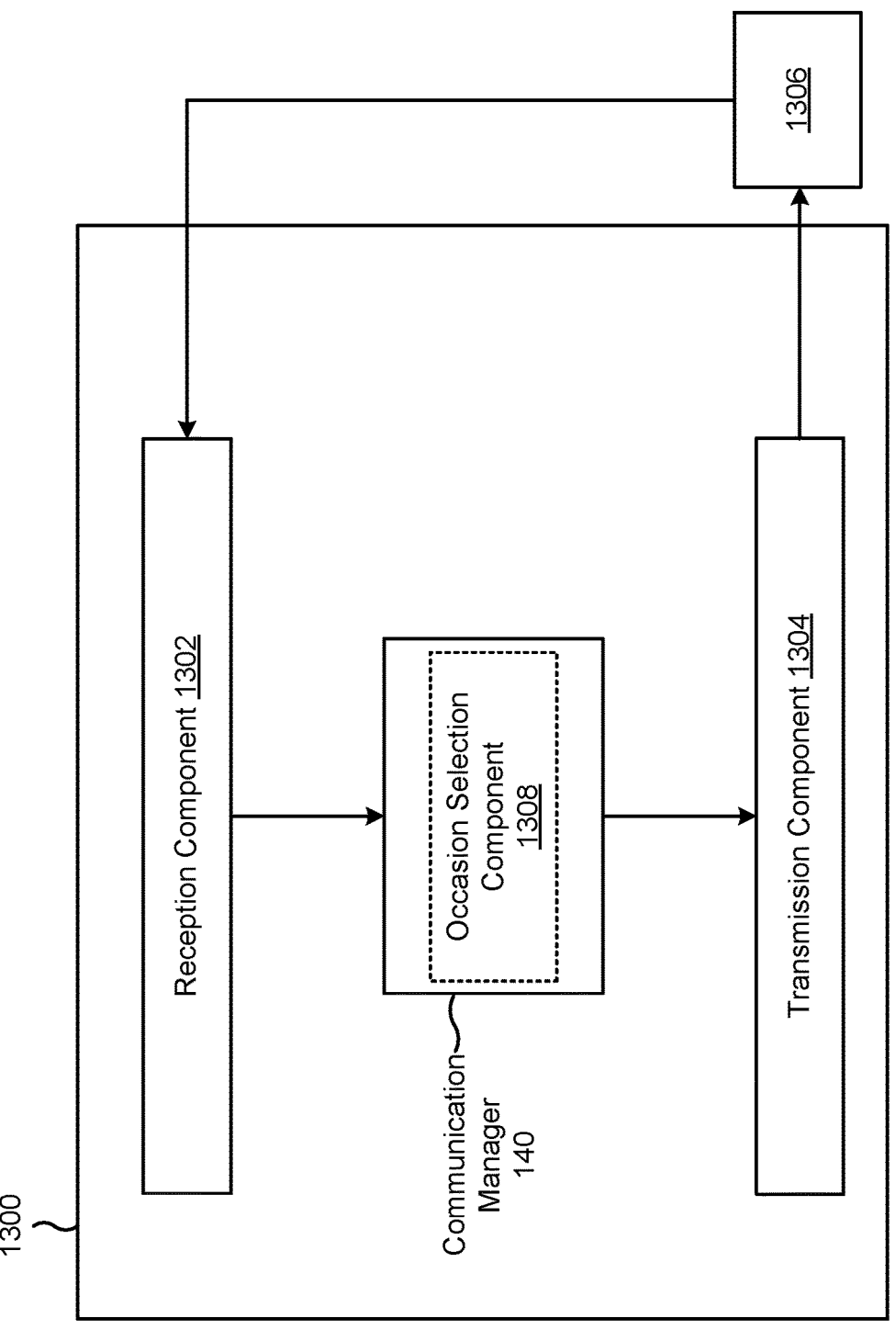
FIG. 13 is a diagram of an example apparatus for wireless communication in accordance with the present disclosure.

FIG. 13 is a diagram of an example apparatus 1300 for wireless communication in accordance with the present disclosure. The apparatus 1300 may be a UE (which may be referred to in connection with FIG. 13 as a first UE), or a UE may include the apparatus 1300. In some aspects, the apparatus 1300 includes a reception component 1302, a transmission component 1304, and a communication manager 140, which may be in communication with one another (for example, via one or more buses). As shown, the apparatus 1300 may communicate with another apparatus 1306 (such as a UE, a base station, or another wireless communication device) using the reception component 1302 and the transmission component 1304.

In some aspects, the apparatus 1300 may be configured to perform one or more operations described herein in connection with FIGS. 7-9. Additionally or alternatively, the apparatus 1300 may be configured to perform one or more processes described herein, such as process 1100 of FIG. 11, or a combination thereof. In some aspects, the apparatus 1300 may include one or more components of the UE described above in connection with FIG. 2.

The reception component 1302 may receive communications, such as reference signals, control information, data communications, or a combination thereof, from the apparatus 1306. The reception component 1302 may provide received communications to one or more other components of the apparatus 1300, such as the communication manager 140. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a modem, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, the communication manager 140 may generate communications and may transmit the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The communication manager 140 may receive or may cause the reception component 1302 to receive an indication of one or more parameters associated with IUC. The communication manager 140 may transmit or may cause the transmission component 1304 to transmit, to a second UE, an IUC communication indicating multiple time-frequency occasions available to the second UE for at least one of a sidelink data communication or a sidelink feedback communication, the multiple time-frequency occasions being based at least in part on the one or more parameters. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as an occasion selection component 1308, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive an indication of one or more parameters associated with IUC. The transmission component 1304 may transmit, to a second UE, an IUC communication indicating multiple time-frequency occasions available to the second UE for at least one of a sidelink data communication or a sidelink feedback communication, the multiple time-frequency occasions being based at least in part on the one or more parameters.

The reception component 1302 may receive, from the second UE, the sidelink data communication or the sidelink feedback communication using at least one time-frequency occasion of the multiple time-frequency occasions.

The reception component 1302 may receive, from the second UE, an IUC request communication requesting IUC information with multiple time-frequency occasions.

The occasion selection component 1308 may select the multiple time-frequency occasions based at least in part on at least one of the one or more parameters, a QoS profile associated with the sidelink data communication, an LBT procedure success rate, a quantity of consecutive LBT failures, a latency requirement associated with the sidelink data communication, or a CBR.

The quantity and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a first user equipment (UE), comprising: receiving, from a second UE, an inter-UE coordination (IUC) communication indicating multiple time-frequency occasions for at least one of a sidelink data communication or a sidelink feedback communication, the multiple time-frequency occasions being based at least in part on one or more parameters; and transmitting, to the second UE or another UE, the sidelink data communication or the sidelink feedback communication using at least one time-frequency occasion of the multiple time-frequency occasions.

Aspect 2: The method of Aspect 1, further comprising transmitting, to the second UE, an IUC request communication requesting IUC information with multiple time-frequency occasions.

Aspect 3: The method of Aspect 2, wherein the IUC request communication indicates at least one of the one or more parameters.

Aspect 4: The method of any of Aspects 1-3, wherein the multiple time-frequency occasions include at least a first time-frequency occasion and a second time-frequency occasion, wherein the first time-frequency occasion and the second time-frequency occasion are duplexed in at least one of a time domain or a frequency domain.

Aspect 5: The method of Aspect 4, wherein the first time-frequency occasion and the second time-frequency occasion are consecutive time-frequency occasions in the time domain, and wherein the first time-frequency occasion and the second time-frequency occasion are separated in the time domain by a time gap.

Aspect 6: The method of any of Aspects 4-5, wherein the first time-frequency occasion and the second time-frequency occasion are consecutive time-frequency occasions in the frequency domain, and wherein the first time-frequency occasion and the second time-frequency occasion are separated in the frequency domain by a frequency offset.

Aspect 7: The method of any of Aspects 1-6, wherein the multiple time-frequency occasions include first multiple time-frequency occasions for an initial transmission of the sidelink data communication or second multiple time-frequency occasions for a sidelink feedback communication.

Aspect 8: The method of Aspect 7, wherein the multiple time-frequency occasions include third multiple time-frequency occasions for a retransmission of the sidelink data communication.

Aspect 9: The method of Aspect 8, wherein the first multiple time-frequency occasions and the third multiple time-frequency occasions include a same quantity of time-frequency occasions.

Aspect 10: The method of any of Aspects 8-9, wherein the first multiple time-frequency occasions and the third multiple time-frequency occasions include different quantities of time-frequency occasions.

Aspect 11: The method of any of Aspects 1-10, wherein the IUC communication is an IUC information communication.

Aspect 12: The method of any of Aspects 1-11, wherein the one or more parameters are based at least in part on at least one of: a quality of service (QoS) profile associated with the sidelink data communication, a listen-before-talk (LBT) procedure success rate, a quantity of consecutive LBT failures, a latency requirement associated with the sidelink data communication, or a channel busy ratio (CBR).

Aspect 13: The method of any of Aspects 1-12, wherein the one or more parameters are pre-configured or defined by a wireless communication standard.

Aspect 14: The method of any of Aspects 1-13, further comprising: transmitting, to the second UE, a sidelink radio resource control (RRC) communication indicating the one or more parameters.

Aspect 15: The method of any of Aspects 1-14, further comprising: transmitting, to the second UE, a sidelink medium access control (MAC) control element (MAC-CE) communication indicating the one or more parameters.

Aspect 16: The method of Aspect 15, wherein the one or more parameters are activated, by the sidelink MAC-CE communication, from a set of parameters that are preconfigured, defined by a wireless communication standard, or indicated by a radio resource control (RRC) configuration.

Aspect 17: The method of any of Aspects 1-16, wherein the one or more parameters include at least one of: a first quantity of the multiple time-frequency occasions for transmissions of the sidelink data communication, a second quantity of time-frequency occasions for initial transmissions of the sidelink data communication, a third quantity of time-frequency occasions for the sidelink feedback communication, a fourth quantity of time-frequency occasions for retransmissions of the sidelink data communication, a time gap between consecutive time-frequency occasions of the multiple time-frequency occasions, or a frequency offset between consecutive time-frequency occasions of the multiple time-frequency occasions.

Aspect 18: The method of any of Aspects 1-17, wherein the one or more parameters include respective values or information associated with one or more quality of service (QoS) profiles or one or more listen-before-talk (LBT) measurements.

Aspect 19: The method of any of Aspects 1-18, wherein transmitting the sidelink data communication or the sidelink feedback communication comprises: measuring, using the at least one of the multiple time-frequency occasions, one or more channel metrics as part of a listen-before-talk (LBT) procedure; and transmitting, using the at least one of the multiple time-frequency occasions, the sidelink data communication or the sidelink feedback communication based at least in part on a measurement value of the one or more channel metrics satisfying a threshold.

Aspect 20: The method of any of Aspects 1-19, wherein transmitting the sidelink data communication or the sidelink feedback communication comprises: transmitting the sidelink data communication or the sidelink feedback communication via an unlicensed or shared frequency band.

Aspect 21: A method of wireless communication performed by a first user equipment (UE), comprising: receiving an indication of one or more parameters associated with inter-UE coordination (IUC); and transmitting, to a second UE, an inter-UE coordination (IUC) communication indicating multiple time-frequency occasions available to the second UE for at least one of a sidelink data communication or a sidelink feedback communication, the multiple time-frequency occasions being based at least in part on the one or more parameters.

Aspect 22: The method of Aspect 21, further comprising: receiving, from the second UE, the sidelink data communication or the sidelink feedback communication using at least one time-frequency occasion of the multiple time-frequency occasions.

Aspect 23: The method of any of Aspects 21-22, further comprising receiving, from the second UE, an IUC request communication requesting IUC information with multiple time-frequency occasions.

Aspect 24: The method of Aspect 23, wherein the indication of the one of the one or more parameters is included in the IUC request communication.

Aspect 25: The method of any of Aspects 21-24, wherein the multiple time-frequency occasions include at least a first time-frequency occasion and a second time-frequency occasion, wherein the first time-frequency occasion and the second time-frequency occasion are duplexed in at least one of a time domain or a frequency domain.

Aspect 26: The method of Aspect 25, wherein the first time-frequency occasion and the second time-frequency occasion are consecutive time-frequency occasions in the time domain, and wherein the first time-frequency occasion and the second time-frequency occasion are separated in the time domain by a time gap.

Aspect 27: The method of any of Aspects 25-26, wherein the first time-frequency occasion and the second time-frequency occasion are consecutive time-frequency occasions in the frequency domain, and wherein the first time-frequency occasion and the second time-frequency occasion are separated in the frequency domain by a frequency offset.

Aspect 28: The method of any of Aspects 21-27, wherein the multiple time-frequency occasions include first multiple time-frequency occasions for an initial transmission of the sidelink data communication and second multiple time-frequency occasions for a sidelink feedback communication.

Aspect 29: The method of Aspect 28, wherein the multiple time-frequency occasions include third multiple time-frequency occasions for a retransmission of the sidelink data communication.

Aspect 30: The method of Aspect 29, wherein the first multiple time-frequency occasions and the third multiple time-frequency occasions include a same quantity of time-frequency occasions.

Aspect 31: The method of any of Aspects 29-30, wherein the first multiple time-frequency occasions and the third multiple time-frequency occasions include different quantities of time-frequency occasions.

Aspect 32: The method of any of Aspects 21-31, wherein the IUC communication is an IUC information communication.

Aspect 33: The method of any of Aspects 21-32, further comprising: selecting the multiple time-frequency occasions based at least in part on at least one of: the one or more parameters, a quality of service (QoS) profile associated with the sidelink data communication, a listen-before-talk (LBT) procedure success rate, a quantity of consecutive LBT failures, a latency requirement associated with the sidelink data communication, or a channel busy ratio (CBR).

Aspect 34: The method of any of Aspects 21-33, wherein the one or more parameters are based at least in part on at least one of: a quality of service (QoS) profile associated with the sidelink data communication, a listen-before-talk (LBT) procedure success rate, a quantity of consecutive LBT failures, a latency requirement associated with the sidelink data communication, or a channel busy ratio (CBR).

Aspect 35: The method of any of Aspects 21-34, wherein the one or more parameters are pre-configured or defined by a wireless communication standard.

Aspect 36: The method of any of Aspects 21-35, wherein receiving the indication of the one or more parameters comprises: receiving, from a network entity, the indication of the one or more parameters.

Aspect 37: The method of any of Aspects 21-36, wherein receiving the indication of the one or more parameters comprises: receiving, from the second UE, a sidelink radio resource control (RRC) communication indicating the one or more parameters.

Aspect 38: The method of any of Aspects 21-37, wherein receiving the indication of the one or more parameters comprises: receiving, from the second UE, a sidelink medium access control (MAC) control element (MAC-CE) communication indicating the one or more parameters.

Aspect 39: The method of Aspect 38, wherein the one or more parameters are activated, by the sidelink MAC-CE communication, from a set of parameters that are pre-configured, defined by a wireless communication standard, or indicated by a radio resource control (RRC) configuration.

Aspect 40: The method of any of Aspects 21-39, wherein the one or more parameters include at least one of: a first quantity of the multiple time-frequency occasions for transmissions of the sidelink data communication, a second quantity of time-frequency occasions for initial transmissions of the sidelink data communication, a third quantity of time-frequency occasions for the sidelink feedback communication, a fourth quantity of time-frequency occasions for retransmissions of the sidelink data communication, a time gap between consecutive time-frequency occasions of the multiple time-frequency occasions, or a frequency offset between consecutive time-frequency occasions of the multiple time-frequency occasions.

Aspect 41: The method of any of Aspects 21-40, wherein the one or more parameters include respective values or information associated with one or more quality of service (QoS) profiles or one or more listen-before-talk (LBT) measurements.

Aspect 42: The method of any of Aspects 21-41, wherein the multiple time-frequency occasions are associated with an unlicensed or shared frequency band.

Aspect 43: An apparatus for wireless communication at a device, comprising a processor; memory coupled with the processor; and instructions stored in the memory and executable by the processor to cause the apparatus to perform the method of one or more of Aspects 1-20.

Aspect 44: A device for wireless communication, comprising a memory and one or more processors coupled to the memory, the one or more processors configured to perform the method of one or more of Aspects 1-20.

Aspect 45: An apparatus for wireless communication, comprising at least one means for performing the method of one or more of Aspects 1-20.

Aspect 46: A non-transitory computer-readable medium storing code for wireless communication, the code comprising instructions executable by a processor to perform the method of one or more of Aspects 1-20.

Aspect 47: A non-transitory computer-readable medium storing a set of instructions for wireless communication, the set of instructions comprising one or more instructions that, when executed by one or more processors of a device, cause the device to perform the method of one or more of Aspects 1-20.

Aspect 48: An apparatus for wireless communication at a device, comprising a processor; memory coupled with the processor; and instructions stored in the memory and executable by the processor to cause the apparatus to perform the method of one or more of Aspects 21-42.

Aspect 49: A device for wireless communication, comprising a memory and one or more processors coupled to the memory, the one or more processors configured to perform the method of one or more of Aspects 21-42.

Aspect 50: An apparatus for wireless communication, comprising at least one means for performing the method of one or more of Aspects 21-42.

Aspect 51: A non-transitory computer-readable medium storing code for wireless communication, the code comprising instructions executable by a processor to perform the method of one or more of Aspects 21-42.

Aspect 52: A non-transitory computer-readable medium storing a set of instructions for wireless communication, the set of instructions comprising one or more instructions that, when executed by one or more processors of a device, cause the device to perform the method of one or more of Aspects 21-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A first user equipment (UE) for wireless communication, comprising:
    at least one memory; and
    at least one processor communicatively coupled with the at least one memory, the at least one processor configured to cause the first UE to:
        receive, from a second UE, an inter-UE coordination (IUC) communication indicating first multiple time-frequency occasions for a sidelink data communication and second multiple time-frequency occasions for a sidelink feedback communication, the first multiple time-frequency occasions and the second multiple time-frequency occasions being based at least in part on one or more parameters, consecutive time-frequency occasions of the second multiple time-frequency occasions being separated by one or more of a time gap or a frequency offset, and the one or more parameters being based at least in part on at least one of:
            a listen-before-talk (LBT) procedure success rate,
            a quantity of consecutive LBT failures, or
            a channel busy ratio (CBR);
        transmit, to the second UE or another UE, the sidelink data communication using at least one time-frequency occasion of the first multiple time-frequency occasions; and
        receive, from the second UE or the other UE, the sidelink feedback communication using at least one time-frequency occasion of the second multiple time-frequency occasions.

2. The first UE of claim 1, wherein the at least one processor is further configured to cause the first UE to:
    transmit, to the second UE, an IUC request communication requesting IUC information with multiple time-frequency occasions, wherein the IUC request communication indicates at least one of the one or more parameters.

3. The first UE of claim 1, wherein the first multiple time-frequency occasions include at least a first time-frequency occasion and a second time-frequency occasion, wherein the first time-frequency occasion and the second time-frequency occasion are duplexed in at least one of a time domain or a frequency domain.

4. The first UE of claim 3, wherein the first time-frequency occasion and the second time-frequency occasion are consecutive time-frequency occasions in the time domain, and wherein the first time-frequency occasion and the second time-frequency occasion are separated in the time domain by another time gap.

5. The first UE of claim 3, wherein the first time-frequency occasion and the second time-frequency occasion are consecutive time-frequency occasions in the frequency domain, and wherein the first time-frequency occasion and the second time-frequency occasion are separated in the frequency domain by another frequency offset.

6. The first UE of claim 1, wherein the IUC communication further indicates third multiple time-frequency occasions for a retransmission of the sidelink data communication.

7. The first UE of claim 6, wherein the first multiple time-frequency occasions and the third multiple time-frequency occasions include a same quantity of time-frequency occasions.

8. The first UE of claim 1, wherein the one or more parameters are based at least in part on at least one of:

a quality of service (QoS) profile associated with the sidelink data communication, or a latency requirement associated with the sidelink data communication.

9. The first UE of claim 1, wherein the at least one processor is further configured to cause the first UE to:

transmit, to the second UE, a sidelink radio resource control (RRC) communication indicating the one or more parameters.

10. The first UE of claim 1, wherein the at least one processor is further configured to cause the first UE to:

transmit, to the second UE, a sidelink medium access control (MAC) control element (MAC-CE) communication indicating the one or more parameters, wherein the one or more parameters are activated, by the sidelink MAC-CE communication, from a set of parameters that are pre-configured, defined by a wireless communication standard, or indicated by a radio resource control (RRC) configuration.

11. The first UE of claim 1, wherein the one or more parameters include at least one of:

a first quantity of the first multiple time-frequency occasions for transmissions of the sidelink data communication, a second quantity of time-frequency occasions for initial transmissions of the sidelink data communication, a third quantity of the second multiple time-frequency occasions for the sidelink feedback communication, a fourth quantity of time-frequency occasions for retransmissions of the sidelink data communication, a time gap between consecutive time-frequency occasions of the first multiple time-frequency occasions, or a frequency offset between consecutive time-frequency occasions of the first multiple time-frequency occasions.

12. The first UE of claim 1, wherein the one or more parameters include respective values or information associated with one or more quality of service (QoS) profiles or one or more LBT measurements.

13. The first UE of claim 1, wherein the at least one processor, to cause the first UE to transmit the sidelink data communication, is configured to cause the first UE to:

measure, using the first multiple time-frequency occasions, one or more channel metrics as part of an LBT procedure; and transmit, using the first multiple time-frequency occasions, the sidelink data communication based at least in part on a measurement value of the one or more channel metrics satisfying a threshold.

14. A first user equipment (UE) for wireless communication, comprising:

at least one memory; and at least one processor communicatively coupled with the at least one memory, the at least one processor configured to cause the first UE to:

receive an indication of one or more parameters associated with inter-UE coordination (IUC), the one or more parameters being based at least in part on at least one of:

a listen-before-talk (LBT) procedure success rate, a quantity of consecutive LBT failures, or a channel busy ratio (CBR);

transmit, to a second UE, an inter-UE coordination (IUC) communication indicating first multiple time-frequency occasions available to the second UE for a sidelink data communication and second multiple time-frequency occasions available to the second UE for a sidelink feedback communication, the first multiple time-frequency occasions and the second multiple time-frequency occasions being based at least in part on the one or more parameters, and consecutive time-frequency occasions of the second multiple time-frequency occasions being separated by one or more of a time gap or a frequency offset;

receive, from the second UE, the sidelink data communication using at least one time-frequency occasion of the first multiple time-frequency occasions; and transmit, to the second UE, the sidelink feedback communication using at least one time-frequency occasion of the second multiple time-frequency occasions.

15. The first UE of claim 14, wherein the at least one processor is further configured to cause the first UE to:

select the first multiple time-frequency occasions or the second multiple time-frequency occasions based at least in part on at least one of:

the one or more parameters, a quality of service (QoS) profile associated with the sidelink data communication, or a latency requirement associated with the sidelink data communication.

16. A method of wireless communication performed by a first user equipment (UE), comprising:

receiving, from a second UE, an inter-UE coordination (IUC) communication indicating first multiple time-frequency occasions for a sidelink data communication and second multiple time-frequency occasions for a sidelink feedback communication, the first multiple time-frequency occasions and the second multiple time-frequency occasions being based at least in part on one or more parameters, consecutive time-frequency occasions of the second multiple time-frequency occasions being separated by one or more of a time gap or a frequency offset, and the one or more parameters being based at least in part on at least one of:

a listen-before-talk (LBT) procedure success rate, a quantity of consecutive LBT failures, or a channel busy ratio (CBR);

transmitting, to the second UE or another UE, the sidelink data communication using at least one time-frequency occasion of the first multiple time-frequency occasions; and receiving, from the second UE or the other UE, the sidelink feedback communication using at least one time-frequency occasion of the second multiple time-frequency occasions.

17. The method of claim 16, further comprising:

transmitting, to the second UE, an IUC request communication requesting IUC information with multiple time-frequency occasions, wherein the IUC request communication indicates at least one of the one or more parameters.

18. The method of claim 16, wherein the first multiple time-frequency occasions include at least a first time-frequency occasion and a second time-frequency occasion, wherein the first time-frequency occasion and the second time-frequency occasion are duplexed in at least one of a time domain or a frequency domain.

19. The method of claim 16, wherein the IUC communication further includes third multiple time-frequency occasions for a retransmission of the sidelink data communication.

20. The method of claim 19, wherein the first multiple time-frequency occasions and the third multiple time-frequency occasions include a same quantity of time-frequency occasions or different quantities of time-frequency occasions.

21. The method of claim 16, wherein the one or more parameters are based at least in part on at least one of:

a quality of service (QoS) profile associated with the sidelink data communication, or a latency requirement associated with the sidelink data communication.

22. The method of claim 16, further comprising:

transmitting, to the second UE, a sidelink radio resource control (RRC) communication indicating the one or more parameters.

23. The method of claim 16, further comprising:

transmitting, to the second UE, a sidelink medium access control (MAC) control element (MAC-CE) communication indicating the one or more parameters.

24. The method of claim 23, wherein the one or more parameters are activated, by the sidelink MAC-CE communication, from a set of parameters that are pre-configured, defined by a wireless communication standard, or indicated by a radio resource control (RRC) configuration.

25. The method of claim 16, wherein the one or more parameters include at least one of:

a first quantity of the first multiple time-frequency occasions for transmissions of the sidelink data communication, a second quantity of time-frequency occasions for initial transmissions of the sidelink data communication, a third quantity of the second multiple time-frequency occasions for the sidelink feedback communication, a fourth quantity of time-frequency occasions for retransmissions of the sidelink data communication, a time gap between consecutive time-frequency occasions of the first multiple time-frequency occasions, or a frequency offset between consecutive time-frequency occasions of the first multiple time-frequency occasions.

26. The method of claim 16, wherein the one or more parameters include respective values or information associated with one or more quality of service (QoS) profiles or one or more LBT measurements.

27. The method of claim 16, wherein transmitting the sidelink data communication comprises:

measuring, using the first multiple time-frequency occasions, one or more channel metrics as part of an LBT procedure; and transmitting, using the first multiple time-frequency occasions, the sidelink data communication based at least in part on a measurement value of the one or more channel metrics satisfying a threshold.

28. The method of claim 16, wherein transmitting the sidelink data communication comprises:

transmitting the sidelink data communication via an unlicensed frequency band or a shared frequency band.

29. A method of wireless communication performed by a first user equipment (UE), comprising:

receiving an indication of one or more parameters associated with inter-UE coordination (IUC), the one or more parameters being based at least in part on at least one of:

a listen-before-talk (LBT) procedure success rate, a quantity of consecutive LBT failures, or a channel busy ratio (CBR);

transmitting, to a second UE, an inter-UE coordination (IUC) communication indicating first multiple time-frequency occasions available to the second UE for a sidelink data communication and second multiple time-frequency occasions available to the second UE for a sidelink feedback communication, the first multiple time-frequency occasions and the second multiple time-frequency occasions being based at least in part on the one or more parameters, and consecutive time-frequency occasions of the second multiple time-frequency occasions being separated by one or more of a time gap or a frequency offset;

receiving, from the second UE, the sidelink data communication using at least one time-frequency occasion of the first multiple time-frequency occasions; and transmitting, to the second UE, the sidelink feedback communication using at least one time-frequency occasion of the second multiple time-frequency occasions.

30. The method of claim 29, further comprising:

selecting the first multiple time-frequency occasions or the second multiple time-frequency occasions based at least in part on at least one of:

the one or more parameters, a quality of service (QoS) profile associated with the sidelink data communication, or a latency requirement associated with the sidelink data communication.

* * * * *